(12) United States Patent
Gane et al.

(10) Patent No.: US 6,666,953 B1
(45) Date of Patent: Dec. 23, 2003

(54) TREATED FILLER OR PIGMENT CONTAINING NATURAL CARBONATE

(75) Inventors: Patrick A. C. Gane, Rothrist (CH); Matthias Buri, Rothrist (CH); Rene Vinzenz Blum, Urban (CH); Beat Karth, Oberoenz (CH)

(73) Assignee: Omya AG, Oftringen (CH)

( * ) Notice: Subject to any disclaimer, the term of this patent is extended or adjusted under 35 U.S.C. 154(b) by 0 days.

(21) Appl. No.: 09/857,217

(22) PCT Filed: Dec. 24, 1999

(86) PCT No.: PCT/IB99/02049

§ 371 (c)(1),
(2), (4) Date: Oct. 15, 2001

(87) PCT Pub. No.: WO00/39222

PCT Pub. Date: Jul. 6, 2000

(30) Foreign Application Priority Data

Dec. 24, 1998 (FR) .............................................. 98 16596

(51) Int. Cl.⁷ ............................................... D21H 17/69
(52) U.S. Cl. .................... 162/181.2; 162/183; 106/464
(58) Field of Search .............................. 162/181.2, 183; 106/464

(56) References Cited

U.S. PATENT DOCUMENTS

| | | | | |
|---|---|---|---|---|
| 4,026,762 A | * | 5/1977 | Bauman | 162/181.2 |
| 4,196,012 A | * | 4/1980 | Windle | 106/137 |
| 4,767,464 A | * | 8/1988 | Strauch et al. | 106/464 |
| 5,378,322 A | * | 1/1995 | Hornsey | 162/181.2 |
| 5,690,897 A | | 11/1997 | Drummond | |

FOREIGN PATENT DOCUMENTS

| | | |
|---|---|---|
| DE | 298 372 | 2/1992 |
| EP | 0 445 952 | 9/1991 |

* cited by examiner

*Primary Examiner*—Peter Chin
(74) *Attorney, Agent, or Firm*—Oblon, Spivak, McClelland, Maier & Neustadt, P.C.

(57) ABSTRACT

The invention concerns a pigment, filler or mineral containing a natural calcium carbonate, treated with one of more providers of $H_3O^+$ ions and gaseous $CO_2$, allowing a reduction in the weight of paper for a constant surface area without loss of physical properties when it is used as a pigment or coating filler for the said paper. In particular, the invention concerns a pigment, filler or mineral containing a natural calcium carbonate or dolomite or mixtures of talc and calcium carbonate, of kaolin and carbonate or carbonate alone or in combination with natural and/or synthetic fibers or similar, treated with one or more medium-strong or strong providers of $H_3O^+$ ions in the presence of gaseous $CO_2$. Applications are particularly in the paper industry, obtaining in particular good sheet properties i.e. a reduction its weight for a given surface area.

59 Claims, 2 Drawing Sheets

SAMPLE OF THE INVENTION (A)

SAMPLE OF THE PREVIOUS TECHNOLOGY (B)

TREATED FILLER OR PIGMENT CONTAINING NATURAL CARBONATE

The present invention concerns the technical field of mineral fillers, in particular for paper-making applications, and their improvement by suitable treatments in order to improve either the manufacturing process of the paper sheet or its properties.

DESCRIPTOPN OF THE BACKGROUND

Such fillers are well known to a specialist in the field and we can quote for example natural calcium carbonate, synthetic or "precipitated" calcium carbonate ("PCC"), and various fillers such as dolomite, mixed fillers based on different carbonates of metals such as calcium joined with magnesium and similar, various fillers such as talc and similar, and mixtures of these fillers, for example mixtures of talc and calcium carbonate, calcium carbonate and kaolin, or mixtures of natural calcium carbonate with aluminium hydroxide, mica or synthetic or natural fibres.

It will also be useful to give details of the process of manufacture of a sheet of paper, board or similar. A specialist in the field will know that a paste ("pulp") is made, essentially comprising fibres (cellulose fibres of natural origin such as from resinous or deciduous wood or of synthetic origin or a mixture of both), a filler as defined above and a suitable proportion of water.

A thick paste or "thick stock" is made and then diluted with water to produce a diluted paste or "thin stock". The pulp receives various additives, such as certain polymers, in order to improve the conditions of flocculation and therefore of "forming" of the sheet, of water retention and of water drainage under the wire. The aqueous medium containing a fraction of the initial filler, which is drained under vacuum under the wire is known as "white liquor". The sheet then undergoes various processes, including an important operation known as coating. It is known that during this coating operation there occur losses of coating color and of coated paper. This coated paper is recycled as a mass filler and is known as "coating broke".

The invention particularly concerns the treatment, by a combination of one or more medium-strong to strong $H_3O^+$ ion-providers in an active gaseous medium, of pigments, of fillers or minerals in aqueous suspension, containing natural carbonate such as natural calcium carbonate or containing any pigment containing natural calcium carbonate in combination with other minerals. It is indeed logical that natural calcium carbonate can be mixed with minerals which are inert with respect to the medium-strong to strong $H_3O^+$ ion-providers well known in the paper industry.

DETAILED DESCRIPTION OF THE INVENTION

Figure 1:
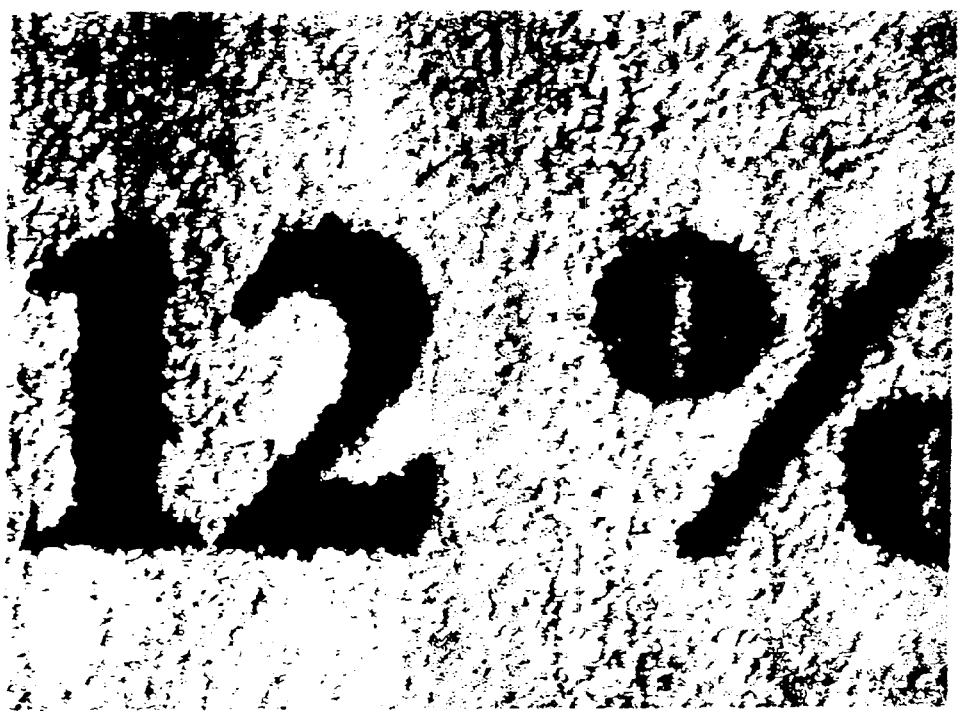
FIG. 1A is an ink jet printing using a product according to the invention.
FIG. 1B is an ink jet printing using a product formed using the prior art.
Figure 1:

Significant applications of the invention are in paper manufacture, obtaining in particular equal or better sheet properties, in particular in terms of opacity, whiteness and reduction in weight for a given thickness. This reduction in the weight of the paper at constant sheet thickness with conservation or improvement of sheet properties will be called the "bulk" property in the remainder of the present application.

A particular and interesting application of the invention concerns, without this of course being restrictive, the improvement of properties when digital printing is used, as in ink-jet printing on a non-coated paper filled with pigment treated according to the invention or on paper surface-treated or coated by using pigments according to the invention.

In this particular area of ink-jet printing, without being restrictive, the invention concerns preparations in which the filler presents simultaneous characteristics of high and coarser granulometry and a high specific area.

Another particular application of the invention is in the field of paints.

Thus the main aim of the invention is to reduce the weight of the paper for a given dimension, while maintaining identical, or even improving, the properties of that paper.

Another important purpose of the invention concerns the treatment and coating of sheets of paper or paper sheets in the wider sense, including boards and similar, by means of preparations according to the invention, in particular the treatment of the pigmented surfaces of the paper sheet.

The reduction of the weight of the paper for a given dimension is of great interest for reasons of transport and in particular the cost of postage, and for environmental reasons in particular savings in natural materials and energy resources.

Thus patent WO 92/06038, of which the aim is to improve the opacity and whiteness of paper containing the bulking agent in the sheet, or coated with a coating color using such an agent, offers a solution which does not provide energy savings.

The properties of opacity and better whiteness are obtained by a highly complex process which occurs during the formation of the paper sheet. As is known, the sheet is formed on a wire by flocculation or agglomeration or interlacing of the various components of the pulp, in particular at the level of the fibres or their fibrils. This "agglomeration" is it facilitated by draining the water which is drawn through the wire. Some of these physical/chemical phenomena may already appear in particular at the level of the "headbox" or, at least, certain transformations or interactions may appear here, favourable to certain properties on the wire and beyond.

Without wishing to be bound by any theory, the Applicant considers that the filler, depending on the treatment which it may or may not have received, will interact differently with the fibres and fibrils. The invention is based on a particular treatment which, in this context, leads to a bulking property i.e. a good interaction with the network of fibres. As is also indicated in document WO 92/06038, bulk results in better light scattering by the sheet.

The problem is made more complicated, however, by the fact that one solution for obtaining bulk, which is to increase the volume of the internal pores in the paper (WO 96/32449, page 2 line 15 etc.), slows down the drainage of water and therefore slows down the paper manufacturing process, whereas the trend is towards faster and faster machines.

The invention also greatly improves the final property of abrasiveness of the pigment during manufacture of the paper i.e. reduces abrasion of the metal or polymer sieve used, and the abrasiveness of the pigment during the coating of the paper i.e. reduces abrasion of the blade used. Patent WO 96/32449 emphasises the importance of this property, indicating that the pigment $TiO_2$ is a good bulking agent but is too abrasive, page 1 line 35 etc. (and, in addition, is costly).

Finally, the present invention also provides the ability to maintain the rigidity of a paper of reduced weight in specific applications such as the manufacture of envelopes.

As indicated above, and confirmed in detail in patents WO 96/32448 and WO 96/32449, two main types of calcium carbonate are known, one natural and the other synthetic.

Synthetic calcium carbonate or "PCC" is obtained in a known manner by a reaction between quick lime or slaked lime with $CO_2$, producing a synthetic calcium carbonate which, depending on the reaction conditions, appears in various forms such as needles or other crystalline forms. There are numerous patents which deal with the synthesis of PCC.

As a purely documentary reference, the patent U.S. Pat. No. 5,364,610 describes a process for manufacturing calcium carbonate which produces a PCC in scalenohedric shapes. As prior art it describes processes for obtaining the product by carbonation using $CO_2$. PCC is quoted as giving the paper improved properties, whiteness in particular. We also mention U.S. Pat. No. 5,075,093.

It is also well known that PCC can give bulk, including the interactions which weaken the fibre network. The above-mentioned patent WO 93/06038 also describes a process for carbonation of lime to obtain a PCC which possesses bulking properties.

Natural calcium carbonate, on the other hand, does not offer this property, whereas it would obviously be useful to be able to obtain it without the industry being obliged to use a synthetic carbonate.

There is therefore a substantial requirement to obtain, from natural carbonates, bulking properties or interactions which are beneficial to the surface properties. Furthermore, it was most surprising, because of the fact that PCC has an unfavourable influence on the strength of the fibre network, that the new pigment according to the invention not only gives the same properties as PCC but also conserves the advantageous properties of natural calcium carbonate.

It was surprising that a pigment was developed with ideal synergetic properties.

Various treatments have previously been proposed by the industry concerned.

Patent WO 96/32448 describes a process for the processing of a dispersion of calcium carbonate (known in the industry as a "slurry") with a low concentration of carbonate (1 to 30% of solid matter) using polyDIMDAC (dimethyldiallyl ammonium homopolymer), which is a cationic aggregating agent of low molecular weight from 10,000 to 500,000, in order to obtain bulk. This patent uses both PCC and ground natural calcium carbonate, referred to as "G(N)CC" or ground natural calcium carbonate, or mixtures thereof. This process is mainly one of flocculation, an aggregation of small particles onto larger ones and the property of interaction with the fibres is principally obtained by the exclusively coarse granulometry of the particles. The physical properties of the paper are then unfavourably affected when its weight diminishes.

Patent WO 96/32449 provides broadly the same information. The aim is to obtain a selective aggregation of fine and ultra-fine particles, using an aggregating agent presenting a charge opposed to the overall charge of the filler.

U.S. Pat. No. 4,367,207, quoted in Patent WO 92/06038, describes a process for treating $CaCO_3$ in the presence of an anionic organopolyphosphonate electrolyte, but the aim is simply to obtain a slurry of finely-divided carbonate.

Patent EP 0 406 662 describes a process for manufacturing synthetic carbonate in which a pre-mix is made of $CaCO_3$ in aragonite form with lime: to this slurry is added a "phosphoric acid derivative" such as phosphoric acid or its salts or various phosphates, cf. page 4 line 17 etc., and finally $CO_2$ is introduced in order to produce conventional carbonation. The purpose of this patent is specifically to obtain a PCC with large particle size and a particular crystalline form (acicular), of which the industrial manufacture was not previously possible. This patent quotes as the prior art other patents covering the manufacture of PCC by carbonation with improvements consisting of introducing CO2 in successive stages or the addition before the reaction of nucleation seeds corresponding to the required crystalline form.

Phosphoric acid is used in Patent EP 0 406 662 in order to produce (page 4 line 46 etc.) specifically the aragonite form via an unidentified "phosphoric acid calcium" which provides new nucleation seeds for the required crystalline form (lines 52 and 55).

The applications of the carbonate obtained are shown in page 5 line 2 etc. Among other insulating and similar properties, carbonate is useful in paper manufacture to allow the incorporation of greater quantities of mineral matter into the paper, producing incombustible interior papers. No properties such as the opacity, gloss or bulk of the paper are mentioned in this Patent, hence this is clearly not the objective. Furthermore, the only application example concerns a carbonate/resin compound.

Processes are also known for giving particular properties to the carbonate.

We shall mention among others the obtaining of properties of resistance to acids, which are useful when the carbonate is employed as a filler in acidic paper-making processes, which are some of the traditional paper manufacture procedures. Thus U.S. Pat. No. 5,043,017 describes the stabilisation of calcium carbonate, and in particular of PCC (col. 1 line 27), by the action of a calcium-chelating agent such as calcium hexametaphosphate, and an associated base which can be an alkaline metal salt of a weak acid (phosphoric, citric, boric, acetic etc.). This document refers to a prior art in which sodium hexametaphosphate is used as a dispersant, where according to which a salt of a weak acid is used after the "primary" carbonation, in the production of PCC, or on the contrary in the first stage of production. This document also cites U.S. Pat. No. 4,219,590, which describes a process for improving dry calcium carbonate by treatment with a "totally dry anhydride gas". In this document, this is an improvement of a known surface treatment effected by a fatty acid or an acid resin or similar products (col. 1 line 17). This document treats the carbonate by boil-off vapours of phosphoric, hydrochloric, nitric, capric or acrylic acid or chlorides or fluorides of aluminium, or of fumaric acid etc. The aim is to split the carbonate particles into fine particles (col. 2 line 65 etc.). The document recommends the use of HF, $SO_2$ or phosphoric anhydride, and the only example is directed towards the use of HF or titanium tetrachloride (the latter improving the opacity of the paper, cf. col 3 line 12 etc.).

U.S. Pat. No. 5,230,734 is also known, which uses $CO_2$ to produce a Ca—Mg carbonate.

Patent WO 97/08247 describes a carbonate formulation, also for paper, obtained by a weak acid method. The carbonate is treated with a mixture of weak base and weak acid, one of which is phosphoric acid, one of the two agents having to be an organic acid derivative.

Patent WO 97/14847 also describes a carbonate resistant to acids, for paper, which is treated with a mixture of two weak acids in order to "de-activate" the surface of the carbonate.

Patent WO 98/20079 also describes a process for rendering a carbonate resistant to acids, and in particular a PCC, by adding calcium silicate and a weak acid or an alum. This document quotes as the prior art U.S. Pat. No. 5,164,006 which uses a treatment by $CO_2$ in order to obtain properties of resistance to an acid medium. However, the addition of products such as zinc chloride is then necessary, which does not meet environmental standards. Furthermore, the pigment according to the invention is not resistant to acids and its reactivity, unexpectedly positive, allows good interaction with the fibres to be obtained.

The industry concerned has thus sought, over several decades, to improve the properties of natural carbonate and/or to produce PCC synthetic carbonates offering specific properties. This research has included certain attempts involving bulk, but no research refers to the use of $CO_2$. This gas is restricted to treatments aimed at giving anti-acid properties, with no relationship to bulk, or the production of PCC by carbonation. Phosphoric acid and $CO_2$ have also been used together, but only to improve the production of PCC.

In fact, in view of the better properties provided by PCC, the industry has above all sought to produce synthetic carbonates presenting more and more improved properties. One merit of the invention is that it seeks to work on the basis of natural carbonates.

The invention therefore concerns the development of new aqueous suspensions of one or more pigments, fillers or minerals which may contain a dispersant polymer to stabilise the rheology of the suspension, the said pigments enabling the weight of the paper at constant surface area to be reduced.

These new aqueous suspensions are characterised by the following:
  a) they contain a natural carbonate and the reaction product or products of the said carbonate with gaseous $CO_2$ and the reaction product or products of the said carbonate with one or more medium-strong to strong providers of $H_3O^+$ ions and
  b) they have a pH greater than 7.5 measured at 20° C.

They are also characterised by the fact that the pigment, filler or mineral has a BET specific surface area, measured in accordance with ISO 9277, ranging from 5 $m^2/g$ to 200 $m^2/g$, preferentially from 20 $m^2/g$ to 80 $m^2/g$ and very preferentially from 30 $m^2/g$ to 60 $m^2/g$.

In a particular manner, the aqueous suspensions according to the invention are characterised by the fact that the pigment, filler or mineral has the following characteristics:
  a mean grain diameter, measured by the sedimentation method on a Sedigraph 5100™ instrument, between 50 and 0.1 microns
  and a BET specific surface area, measured in accordance with ISO 9277, ranging from 15 $m^2/g$ to 200 $m^2/g$ In an even more particular manner they are characterised by the fact that the pigment, filler or mineral has the following characteristics:
  a mean grain diameter, measured by the sedimentation method on a Sedigraph 5100™ instrument, between 25 and 0.5 microns and even more particularly between 7 and 0.7 microns
  and a BET specific surface area, measured in accordance with ISO 9277, ranging from 20 $m^2/g$ to 80 $m^2/g$ and even more particularly between 30 and 60 $m^2/g$.

The invention also concerns pigments or fillers in the dry state such as natural calcium carbonate or any pigment containing natural calcium carbonate, obtained by drying aqueous suspensions according to the invention, this drying being performed by using the drying devices well known to a specialist in the field.

The invention also concerns the treatment of pigments or fillers in aqueous suspension, such as natural calcium carbonate or any pigment containing natural calcium carbonate, or mixtures thereof including with other fillers and pigments not containing carbonate ions, compositions containing them and their paper-making applications, in particular to obtain good bulk properties and papers thus filled or coated.

More precisely, the invention concerns an aqueous suspension of pigments, fillers or minerals which may contain a dispersant polymer as a stabiliser of the rheology of the suspension and including a natural carbonate such as for example natural calcium carbonate or dolomite, treated in combination by one or more medium-strong to strong providers of $H_3O^+$ ions and gaseous $CO_2$.

We will quote as examples various natural carbonates obtained from chalk, in particular chalk from Champagne, calcite or marble, and mixtures thereof with talc, kaolin and/or dolomite, and/or hydroxides of aluminium, and/or titanium oxide, magnesium oxide and similar oxides and hydroxides known in the industry concerned.

In the present application, these different fillers and mixtures of fillers or mixed fillers will be grouped for convenience under the general term "fillers" except where a more precise naming of a filler or category of filler is required.

The acid used will be any medium-strong or strong acid or any mixture of such acids, generating $H_3O^+$ ions under the processing conditions.

In a mode of implementation which is also preferred, the strong acid will be chosen among the acids with a pKa value lower than or equal to zero at 22° C. and more particularly chosen from sulphuric acid, hydrochloric acid or mixtures thereof.

In a mode of implementation which is also preferred, the medium-strong acid will be chosen among the acids with a pKa value between 0 and 2.5 inclusive at 22° C. and more particularly chosen from $H_2SO_4$, $HSO_4^-$, $H_3PO_4$ and oxalic acid or mixtures thereof. We can quote as a particular example a $pKa_1$ of $H_3PO_4$ equal to 2.161 (Römpp Chemie, Edition Thieme).

In a mode of implementation which is also preferred, the medium-strong acid or acids can be mixed with the strong acid or acids.

According to the invention, the molar quantity of medium-strong to strong providers of $H_3O^+$ ions relative to the number of moles of $CaCO_3$ is in total between 0.1 and 2 and preferably between 0.25 and 1.

According to the invention, the process for treating pigments, fillers or minerals in aqueous suspension and containing a natural carbonate, is characterised by the fact that the said pigment is treated by a combination of one or more medium-strong to strong providers of $H_3O^+$ ions and gaseous $CO_2$.

In a preferred manner this process according to the invention for treating pigments, fillers or minerals in aqueous suspension and containing a natural carbonate providing a reduction in the weight of the paper at a constant surface area is characterised by the fact that it comprises the 3 following stages:

a) Treatment with one or more medium-strong to strong providers of $H_3O^+$ ions
b) Treatment with gaseous CO2, whether this treatment be an integral part of stage a), be carried out in parallel with stage a) or be carried out after stage a)
c) The raising of pH beyond 7.5, measured at 20° C., in a time interval after the end of stages a) and b) of between 1 hour and 10 hours and preferably between 1 hour and 5 hours without addition of a base, or immediately after the end of stages a) and b) with the addition of a base, stage c) being the final stage in the process.

In a preferred manner also, the gaseous $CO_2$ comes from an external $CO_2$ supply or from the recirculation of $CO_2$ or from the continuous addition of the same medium-strong to strong provider of $H_3O^+$ ions as used in stage a) of the treatment or from another medium-strong to strong provider of $H_3O^+$ ions or from an excess pressure of $CO_2$, preferably an excess pressure of between 0.05 and 5 bars. In this regard, it should be noted that the processing tank, filled with fillers having a specific gravity of the order of 1 to 2, may reach a height of for example 20 meters and hence create an excess pressure of $CO_2$ which can reach several bars and in particular up to approximately 5 bars at the bottom of the tank or in a closed tank.

In a preferred mode of implementation, stages a) and b) may be repeated several times.

Similarly, in a preferred mode of implementation, the pH measured at 20° C. ranges from 3 to 7.5 during stages a) and b) of processing and the processing temperature is between 5° C. and 90° C. and preferably between 45° C. and 60° C.

In another preferred mode of implementation, between 1 hour and 10 hours and more particularly between 1 hour and 5 hours after the end of processing, the pH is greater than 7.5 at ambient temperature without the addition of any base whatever. If any base is added, the pH then rises immediately. It should moreover be noted that after several days no resistance to acids is observed.

The process for treating pigments, fillers or minerals in aqueous suspension and containing a natural carbonate providing a reduction in the weight of the paper at a constant surface area according to the invention is characterised by the fact that the concentration of gaseous $CO_2$ in the suspension is, in terms of volume, such that the ratio (volume of suspension:volume of gaseous $CO_2$) is between 1:0.05 and 1:20 with the said ratio being between 1:1 and 1:20 in stage a) and between 1:0.05 and 1:1 in stage b).

In a highly preferable manner, the concentration of gaseous $CO_2$ in the suspension is, in terms of volume, such that the ratio (volume of suspension:volume of gaseous $CO_2$) is between 1:0.05 and 1:5 with the said ratio being between 1:0.5 and 1:10 in stage a) and between 1:0.05 and 1:1 in stage b).

The gaseous $CO_2$ may be introduced in liquid or anhydride form.

In a manner which is also preferred, the duration of stage b) of the treatment is from 0 to 10 hours and preferably from 2 to 6 hours.

The treatment process according to the invention is implemented in the aqueous (slurry) phase at low, medium-high or high concentrations of dry matter, but can also be implemented for mixtures of slurries at those differing concentrations. In a preferential manner, the dry matter content by weight is between 1% and 80%.

Without wishing to be bound by any theory, the Applicant believes that the gaseous $CO_2$ plays the part, among others, of a pH regulator and a regulator of adsorption/desorption.

According to a mode of the invention, the process of manufacturing the aqueous suspension according to the invention is characterised by the fact that, after the three stages of the treatment process of the invention, the treated product is put into aqueous suspension with the aid of a dispersion agent and may be reconcentrated.

The aqueous suspension of filler obtained according to the invention may be incorporated in the process of manufacture of the sheet of paper, board or similar at the level of preparation of the thick stock or thin stock or at both levels depending on the paper-making process. The filler is in fact introduced in one or more operations according to the usual recommendations of the paper manufacturers.

The filler treated according to the invention also presents a great advantage after formation of the sheet, and one can in particular incorporate the filler according to the invention in the recycled white liquor or in the "coating broke", also recycled.

The treatment according to the invention may alternatively also be applied to the recycled white liquor or coating broke, in which case the recycled medium is treated in accordance with the processing stages according to the invention as described above.

The invention applies to the manufacture of paper from cellulose fibres of wood origin such as from deciduous or resinous timber.

The invention also applies to paper made from fibres which are not from wood but are of synthetic origin.

The invention also concerns processes for manufacturing paper, board or similar thus modified in order to incorporate the process according to the invention.

The invention also concerns new products obtained by the process which has just been described.

The following examples illustrate the invention without restricting its scope.

A series of tests were performed on slurries with a low solid matter content i.e. of the order of 30% at most, with another series of tests for slurries with a high solid matter content of up to approximately 80%.

The high content levels are of great interest to the industry under consideration but present particular problems of viscosity. It is often necessary to adopt the option of adding a dispersant which may involve disadvantages for the process (interference from the dispersant by competing reactions in terms of adsorption phenomena on the surface of the carbonate or other types of filler).

EXAMPLE 1

This example illustrates the invention and concerns the processing of slurries with low dry matter content.

To achieve this, in all the tests of Example 1 involving aqueous suspensions with low dry matter content, we prepare $CaCO_3$ or the mixture of minerals containing calcium carbonate, in the form of a slurry with a dry matter content varying between 5% and 30% by weight, or in the form of a filter cake, or in the form of a dry powder, in an appropriate reactor, and if necessary it is diluted to the required level of dry matter using distilled water or tap water.

For the test involving an aqueous suspension with a medium dry matter content, $CaCO_3$ is prepared in the form of a slurry with a dry matter content of approximately 45% by weight.

For all the tests, we used a glass reactor with a capacity of 1 liter or 10 liters or a plastic container with a capacity of 100 liters or a tank with a capacity of 40 $m^3$ incorporating a rotor-stator agitator with a high-speed agitator having a rotating disk of a diameter of 50 mm for the 1 liter and 10 liter reactors or 200 mm for the 100 liter plastic container or 1500 mm for the 40 m³ tank.

For certain tests of which details will be given in the following examples, we used a Lödige fluidised-bed mixer of 6 liters or 600 liters.

After mixing to homogeneity, the suspension or slurry is adjusted to the temperature for the test.

We then add a medium-strong to strong provider of $H_3O^+$ ions, preferably chosen from among $H_2SO_3$, $HSO_4^-$, $H_3PO_4$, oxalic acid or mixtures thereof in the form of a solution with a concentration of from 1% to 85% by weight, over a specific time interval. The deviations are described below.

We add or introduce $CO_2$ from the bottom of the vessel or using a lance immersed from above, for the period of time indicated below.

The control is a paper manufactured simultaneously in the same manner with the same quantity of non-treated filler at 75 g/m² and the same batch of cellulose.

Test No. 1:

We dilute 5 kg, calculated on the basis of dry pigment, of natural Norwegian marble calcium carbonate with granulometry such that 75% of the particles have a diameter of less than 1μ measured using a Sedigraph 5100™ instrument from Micrometrics, in the form of a filter cake, using distilled water in the 100 liter container until a slurry is obtained with a concentration of 10% by weight of dry matter. The slurry thus formed is then treated using sulphuric acid in a solution of 10% by weight corresponding to 0.20 moles of $H_3O^+$ per mole of $CaCO_3$, at 20° C. under agitation for 2 minutes at 500 revolutions per minute. After 15 minutes $CO_2$ is bubbled at an excess pressure of 50 mbar for 5 hours through the suspension of calcium carbonate such that the ratio volume of suspension:volume of gaseous $CO_2$ is approximately equal to 1:0.15.

After 24 hours of storage, paper sheets are formed containing as a filler the suspension of calcium carbonate to be tested.

In order to do this we make sheets of paper from a pulp or paste with an SR value of 23 containing a sulphated paste of wood and fibres composed of 80% of birch and 20% of pine. We then dilute 45 dry grams of this pulp or paste in 10 liters of water in the presence of approximately 15 dry grams of the filler preparation to be tested in order to obtain experimentally a filler content of 20% within 0.5%. After 15 minutes of agitation and adding 0.06% by dry weight, relative to the dry weight of the paper, of a polyacrylamide retaining agent, we form a sheet with a grammage of 75 g/m² filled to (20±0.5%). The system used to form the sheet is a Rapid-Köthen model 20.12 MC from the Haage company.

The sheets thus formed are dried for 400 seconds at 92° C. under a vacuum of 940 mbar. The filler content is determined by ash analysis.

The sheet being thus formed, the thickness is measured.

The thickness of the paper or board sheet is the perpendicular distance between two parallel surfaces.

The samples are conditioned for 48 hours (German Standard DIN EN 20187).

This Standard specifies that paper is a hygroscopic substance and as such presents the characteristics of being able to adapt its moisture content in order to match it to that of the ambient air. Moisture is absorbed when the ambient air undergoes an increase in humidity and is in contrast released when the ambient air undergoes a decrease in humidity.

Even if the relative humidity remains constant, the moisture content of the paper does not necessarily remain constant if the temperature is not maintained at a constant value within certain limits. When an increase or a decrease in the humidity constant occurs, the physical properties of the paper are changed.

For this reason, the samples must be conditioned for a period of at least 48 hours in order for equilibrium to be reached. The samples are also tested under identical climatic conditions.

The test climate for the paper is defined as follows:

| Relative humidity | 50% (±3) |
|---|---|
| Temperature | 23° C. (±1) |

The thickness is determined in accordance with the German Standard DIN EN 20534 using a micrometer of which the test print is 10 N/cm². The test result is determined from the mean of 10 measurements and is expressed in micrometers.

The control is a paper manufactured simultaneously in the same manner with the same quantity of filler, non-treated, at 75 g/m² and the same batch of cellulose.

The results are:
a) For the pigment:
  5 hours after the end of treatment of the natural calcium carbonate in the test, the pH of the slurry is 7.6, which signifies no stability towards acids.
b) For the paper:
  The thickness measurements are:
    For the initial sample, the control: 112 μm at 75 g/m²
    For the test sample: 120 μm at 75 g/m², which equates to 70 g/m² for a thickness of 112 μm.

We see that in this test, if the paper thickness is brought to a common value of 112 μm, we gain 5 g/m² or 6.6% of the weight of the paper, which means a significant gain in environmental terms.

Test No. 2:

We treat, in the 10 liter glass reactor and under agitation, 3 kg, calculated on the basis of dry pigment, of Norwegian marble filter cake with granulometry such that 75% of the particles have a diameter of less than 1μ measured using a Sedigraph 5100™ instrument from Micrometrics in the form of a slurry at a dry matter concentration of 10% by weight at a temperature of 20° C. using phosphoric acid in a solution of 10% by weight corresponding to 0.15 moles of $H_3O^+$ per mole of $CaCO_3$. $CO_2$ is then bubbled through the slurry at an excess pressure of approximately 100 mbar for 5 hours such that the ratio volume of suspension:volume of gaseous $CO_2$ is approximately equal to 1:0.1. Immediately after production, as well as after 1 hour, 2 hours, 3 hours, 4 hours and 5 hours, the pH is measured. Sheets are formed from the slurry with a low dry weight content. With 0.53% by weight, relative to the weight of dry pigment, of a sodium polyacrylate dispersion agent with a specific viscosity of 0.75, it is possible to raise the dry matter concentration to a value of 47% by weight.

The specific viscosity of the anionic dispersion agents in the examples, denoted by the Greek letter "η", is determined in the following manner: a solution of the polymer is made, 100% neutralised for the measurement by a solution of sodium hydroxide (pH 9), by dissolving 50 g of the dry polymer in 1 liter of distilled water containing 60 g of NaCl. Then, in a capillary viscosity meter with a Baumé constant of 0.000105 in a temperature-stabilised heating bath at 25° C., the time required for a precisely defined volume of the alkaline polymer solution to flow through the capillary is measured and is compared with the time in which the same volume of the solution of 60 g of NaCl per liter passes through the capillary.

The specific viscosity η is given by the following expression:

$$\eta = \frac{\text{flow time of polymer solution} - \text{flow time of NaCl solution}}{\text{flow time of NaCl solution}}$$

The best results are obtained when the capillary diameter is chosen such that the time required by the polymer solution minus the time required by the solution containing NaCl only is in the range of 90 to 100 seconds.

After 24 hours of storage, the sheets of paper are formed with the same operating mode as in Test no. 1, at 75 g/m², and the thickness is measured with the same method as in Test no. 1.

The results are:
a) For the pigment:
   3 hours after the end of treatment of the natural calcium carbonate in the test, the pH of the slurry is 7.5, which signifies no stability towards acids.
b) For the paper:
   The thickness measurements are:
   For the initial sample, the control: 113 μm at 75 g/m²
   For the test sample: 123 μm at 75 g/m², which equates to 68.9 g/m² for a thickness of 113 μm.

We see that in this test, if the paper thickness is brought to a common value of 113 μm, we gain 6.1 g/m² or 8.8% of the weight of the paper, which means a significant gain in environmental terms.

We also make measurements of the opacity and whiteness of the sheets previously formed.

Opacity is measured as being an index of the translucency of the paper sheets, using a Data Color Elrepho 2000 spectrometer in accordance with the DIN 53 146 Standard.

The whiteness of the paper is measured according to the ISO Standard known as Brightness R 457, with a Tappi filter and ultraviolet light, using a Data Color Elrepho 2000 spectrometer. The measurement is made on a stack of 10 sheets in order to avoid the effects of translucence.

The following results were obtained using the operating procedure described above:

Whiteness of the test sample according to the invention: 89.6

Opacity of the test sample according to the invention: 89.4

Whiteness of the control sample (non-treated): 88.4

Opacity of the control sample (non-treated): 86.4

Test No. 3:

In a glass reactor, we treat 75 g, calculated on the basis of dry pigment, of Norwegian marble filter cake with granulometry such that 75% of the particles have a diameter of less than 1μ measured using a Sedigraph 5100™ instrument from Micrometrics in the form of a slurry at a dry matter concentration of 10% by weight at a temperature of 20° C. using phosphoric acid in a solution of 10% by weight corresponding to 0.25 moles of $H_3O^+$ per mole of $CaCO_3$. $CO_2$ is then bubbled through the slurry at atmospheric pressure for 5 hours such that the ratio volume of suspension:volume of gaseous $CO_2$ is approximately equal to 1:0.05.

After 24 hours of storage, the sheets of paper are formed with the same operating mode as in Test no. 1, at 75 g/m², and the thickness is measured with the same method as in Test no. 1.

The results are:
a) For the pigment:
   5 hours after the end of treatment of the natural calcium carbonate in the test, the pH of the slurry is 7.7, which signifies no stability towards acids.
b) For the paper:
   The thickness measurements are:
   For the initial sample, the control with no treatment of filler: 113 μm at 75 g/m²
   For the test sample: 119 μm at 75 g/m², which equates to 71.1 g/m² for a thickness of 113 μm.

We see that in this test, if the paper thickness is brought to a common value of 113 μm, we gain 3.9 g/m² or 5.2% of the weight of the paper, which means a significant gain in environmental terms.

Test No. 4:

We treat 1 kg, calculated in terms of dry pigment, of Finnish marble calcium carbonate of granulometry such that 63% of the particles have a diameter of less than 1μ measured using a Sedigraph 5100™ instrument from Micrometrics, wet-crushed to a 75% concentration of dry matter, by using 0.55% by weight of sodium polyacrylate having a specific viscosity of 0.54, diluted to a slurry concentration in dry matter of 45% by weight at a temperature of 20° C. using phosphoric acid in a solution of 10% by weight corresponding to 0.15 moles of $H_3O^+$ per mole of $CaCO_3$. $CO_2$ is then bubbled through the slurry at an excess pressure of approximately 100 mbar for 5 hours such that the ratio volume of suspension:volume of gaseous CO2 is approximately equal to 1:0.1.

The product is filtered and after 24 hours of storage the sheets of paper are formed with the same operating mode as in Test no. 1, at 75 g/m². The thickness is also measured with the same method as in Test no. 1, the results then being compared with those obtained using the non-treated calcium carbonate product of granulometry such that 63% of the particles by weight have a diameter of less than 1μ measured using a Sedigraph 5100™ instrument from Micrometrics.

The results are:
a) For the pigment:
   2 hours after the end of treatment of the natural calcium carbonate in the test, the pH of the slurry is 7.6, which signifies no stability towards acids.
b) For the paper:
   The thickness measurements are:
   For the initial sample, the control with no treatment of filler: 113 μm at 75 g/m²
   For the test sample: 116 μm at 75 g/m², which equates to 72.9 g/m² for a thickness of 113 μm.

We see that in this test, if the paper thickness is brought to a common value of 113 μm, we gain 2.1 g/m² or 2.8% of the weight of the paper, which means a significant gain in environmental terms.

Test No. 5:

In a glass reactor, we treat 75 g, calculated on the basis of dry pigment, of Norwegian marble calcium carbonate with granulometry such that 75% of the particles have a diameter of less than 1μ measured using a Sedigraph 5100™ instrument from Micrometrics in the form of a slurry at a dry matter concentration of 10% by weight at a temperature of 35° C. using phosphoric acid in a solution of 10% by weight corresponding to 0.15 moles of $H_3O^+$ per mole of $CaCO_3$. $CO_2$ is then bubbled through the slurry at atmospheric pressure for 5 hours such that the ratio volume of suspension:volume of gaseous CO2 is equal to 1:0.05.

After 24 hours of storage, the sheets of paper are formed with the same operating mode as in Test no. 1, at 75 g/m², and the thickness is measured with the same method as in Test no. 1.

The results are:
a) For the pigment:
   5 hours after the end of treatment of the natural calcium carbonate in the test, the pH of the slurry is 7.8, which signifies no stability towards acids.
b) For the paper:
   The thickness measurements are:
      For the initial sample, the control with no treatment of filler: 113 μm at 75 g/m$^2$
      For the test sample: 118 μm at 75 g/m$^2$, which equates to 71.8 g/m$^2$ for a thickness of 113 μm.
   We see that in this test, if the paper thickness is brought to a common value of 113 μm, we gain 3.2 g/m$^2$ or 4.2% of the weight of the paper, which means a significant gain in environmental terms.

Test No. 6:

In a glass reactor, we treat 75 g, calculated on the basis of dry pigment, of Norwegian marble calcium carbonate with granulometry such that 75% of the particles have a diameter of less than 1μ measured using a Sedigraph 5100™ instrument from Micrometrics in the form of a slurry at a dry matter concentration of 10% by weight at a temperature of 45° C. using phosphoric acid in a solution of 10% by weight corresponding to 0.30 moles of $H_3O^+$ per mole of $CaCO_3$. $CO_2$ is then bubbled through the slurry at atmospheric pressure for 5 hours such that the ratio volume of suspension:volume of gaseous CO2 is equal to 1:0.05.

After 24 hours of storage, the sheets of paper are formed with the same operating mode as in Test no. 1, at 75 g/m$^2$, and the thickness is measured with the same method as in Test no. 1.

The results are:
a) For the pigment:
   4 hours after the end of treatment of the natural calcium carbonate in the test, the pH of the slurry is 7.9, which signifies no stability towards acids.
b) For the paper:
   The thickness measurements are:
      For the initial sample, the control with no treatment of filler: 113 μm at 75 g/m$^2$
      For the test sample: 118 μm at 75 g/m$^2$, which equates to 71.8 g/m$^2$ for a thickness of 113 μm.
   We see that in this test, if the paper thickness is brought to a common value of 113 μm, we gain 3.2 g/m$^2$ or 4.2% of the weight of the paper, which means a significant gain in environmental terms.

Test No. 7:

In a glass reactor, we treat 36 g, calculated in terms of dry pigment, of Finnish marble calcium carbonate of granulometry such that 65% of the particles have a diameter of less than 1μ measured using a Sedigraph 5100™ instrument from Micrometrics, at 21.6% by weight, in the form of a slurry at a dry matter concentration of 4.8% by weight (i.e. more diluted) using phosphoric acid in a solution of 5% by weight corresponding to 0.32 moles of $H_3O^+$ per mole of $CaCO_3$. $CO_2$ is then bubbled through the slurry at atmospheric pressure for 5 hours such that the ratio volume of suspension:volume of gaseous CO2 is approximately equal to 1:0.05.

After 24 hours of storage, the sheets of paper are formed with the same operating mode as in Test no. 1, at 75 g/m$^2$. The thickness is also measured with the same method as in Test no. 1.

The results are:
a) For the pigment:
   6 hours after the end of treatment of the natural calcium carbonate in the test, the pH of the slurry is 7.5, which signifies no stability towards acids.
b) For the paper:
   The thickness measurements are:
      For the initial sample, the control with no treatment of filler: 113 μm at 75 g/m$^2$
      For the test sample: 121 μm at 75 g/m$^2$, which equates to 70.0 g/m$^2$ for a thickness of 113 μm.
   We see that in this test, if the paper thickness is brought to a common value of 113 μm, we gain 5 g/m$^2$ or 6.6% of the weight of the paper, which means a significant gain in environmental terms.

Test No. 8:

In a glass reactor, we treat 3750 g, calculated in terms of dry pigment, of Finnish marble calcium carbonate of granulometry such that 65% of the particles have a diameter of less than 1μ measured using a Sedigraph 5100™ instrument from Micrometrics, at 75.0% by weight, in the form of a slurry at a dry matter concentration of 20% by weight and a temperature of 60° C. using phosphoric acid in a solution of 5% by weight corresponding to 0.5 moles of $H_3O^+$ per mole of $CaCO_3$. $CO_2$ is then bubbled through the slurry at atmospheric pressure for 2 hours such that the ratio volume of suspension:volume of gaseous CO2 is approximately equal to 1:0.1.

After 24 hours of storage, the sheets of paper are formed with the same operating mode as in Test no. 1, at 75 g/m$^2$. The thickness is also measured with the same method as in Test no. 1.

The results are:
a) For the pigment:
   6 hours after the end of treatment of the natural calcium carbonate in the test, the pH of the slurry is 7.8, which signifies no stability towards acids.
b) For the paper:
   The thickness measurements are:
      For the initial sample, the control with no treatment of filler: 113 μm at 75 g/m$^2$
      For the test sample: 132 μm at 75 g/m$^2$, which equates to 64.2 g/m$^2$ for a thickness of 113 μm.
   We see that in this test, if the paper thickness is brought to a common value of 113 μm, we gain 10.8 g/m$^2$ or 14.4% of the weight of the paper, which means a significant gain in environmental terms.

Test No. 9:

In a glass reactor, we treat 36 g, calculated in terms of dry pigment, of Finnish marble calcium carbonate of granulometry such that 65% of the particles have a diameter of less than 1μ measured using a Sedigraph 5100™ instrument from Micrometrics, at 21.6% by weight, in the form of a slurry at a dry matter concentration of 4.8% by weight but at a temperature of 45° C. using phosphoric acid in a solution of 5% by weight corresponding to 0.32 moles of $H_3O^+$ per mole of $CaCO_3$. $CO_2$ is then bubbled through the slurry at atmospheric pressure for 5 hours such that the ratio volume of suspension:volume of gaseous CO2 is approximately equal to 1:0.05.

After 24 hours of storage, the sheets of paper are formed with the same operating mode as in Test no. 1, at 75 g/m$^2$. The thickness is also measured with the same method as in Test no. 1.

The results are:
a) For the pigment:
   8 hours after the end of treatment of the natural calcium carbonate in the test, the pH of the slurry is 8,1, which signifies no stability towards acids.

b) For the paper:
    The thickness measurements are:
        For the initial sample, the control with no treatment of filler: 113 μm at 75 g/m²
        For the test sample: 126 μm at 75 g/m², which equates to 67.1 g/m² for a thickness of 113 μm.

We see that in this test, if the paper thickness is brought to a common value of 113 μm, we gain 7.9 g/m² or 10.5% of the weight of the paper, which means a significant gain in environmental terms.

A measurement of abrasion gives 1.7 mg, which should be compared with the abrasion measurement of 4.5 mg on the control.

Test No. 10:

In a glass reactor, we treat 36 g, calculated in terms of dry pigment, of Finnish marble calcium carbonate of granulometry such that 65% of the particles have a diameter of less than 1μ measured using a Sedigraph 5100™ instrument from Micrometrics, at 21.6% by weight, in the form of a slurry at a dry matter concentration of 4.8% by weight but at a temperature this time of 90° C. using phosphoric acid in a solution of 5% by weight corresponding to 0.32 moles of $H_3O^+$ per mole of $CaCO_3$. $CO_2$ is then bubbled through the slurry at atmospheric pressure for 5 hours such that the ratio volume of suspension:volume of gaseous $CO_2$ is approximately equal to 1:0.05.

After 24 hours of storage, the sheets of paper are formed with the same operating mode as in Test no. 1, at 75 g/m². The thickness is also measured with the same method as in Test no. 1.

The results are:
a) For the pigment:
    2 hours after the end of treatment of the natural calcium carbonate in the test, the pH of the slurry is 7.5, which signifies no stability towards acids.
b) For the paper:
    The thickness measurements are:
        For the initial sample, the control with no treatment of filler: 113 μm at 75 g/m²
        For the test sample: 125 μm at 75 g/m², which equates to 67.7 g/m² for a thickness of 113 μm.

We see that in this test, if the paper thickness is brought to a common value of 113 μm, we gain 7.3 g/m² or 9.7% of the weight of the paper, which means a significant gain in environmental terms.

A measurement of abrasion, using an Einlehner Type 2000 instrument, gives a value of 2.0 mg which should be compared with the control value of 4.5 mg.

The above tests show that the advantages of the invention lie in a reduction of weight at an identical sheet thickness, and in a reduction in abrasion, better smoothness for better whiteness, and improved filler retention.

Test No. 11:

In a reactor with a capacity of 40 m3 and a height of 12 m, we treat 3600 kg, calculated in terms of dry pigment, of Carrare marble calcium carbonate of granulometry such that 65% of the particles have a diameter of less than 1μ measured using a Sedigraph 5100™ instrument from Micrometrics, at 28.6% by weight, in the form of a slurry at a dry matter concentration of 24.8% by weight and a temperature of 55° C. using phosphoric acid in a solution of 10% by weight corresponding to 0.30 moles of $H_3O^+$ per mole of $CaCO_3$. $CO_2$ is then bubbled through the slurry for 5 hours by recycling internal $CO_2$ and injecting $CO_2$ at the bottom of the reactor at an excess pressure of 1.2 bar such that the ratio volume of suspension:volume of gaseous $CO_2$ is approximately equal to 1:5.

After 24 hours of storage, the sheets of paper are formed with the same operating mode as in Test no. 1, at 75 g/m². The thickness is also measured with the same method as in Test no. 1.

The results are:
a) For the pigment:
    5 hours after the end of treatment of the natural calcium carbonate in the test, the pH of the slurry is 7.7, which signifies no stability towards acids.
    The BET specific surface area is 35.5 m²/g.
    This measurement of the BET specific surface area is determined in accordance with the BET method of the ISO 9277 Standard i.e. the measurement is performed under cooling with liquid nitrogen and under a nitrogen flow on the sample dried to constant weight and maintained at 250° C. for one hour in a nitrogen atmosphere. These conditions are those of the Standard known particularly as the ISO 9277 Standard in the Claims.
b) For the paper:
    The thickness measurements are:
        For the initial sample, the control with no treatment of filler: 113 μm at 75 g/m²
        For the test sample: 126 μm at 75 g/m², which equates to 67.3 g/m² for a thickness of 113 μm.

We see that in this test, if the paper thickness is brought to a common value of 113 μm, we gain 7.7 g/m² or 10.3% of the weight of the paper, which means a significant gain in environmental terms.

Test No. 12:

This test illustrates the invention and involves an example of coating at different grammages on a plastic base using on the one hand a coating color at a low concentration of non-treated filler and on the other hand a coating color at a low concentration of filler treated according to the invention.

The general operating procedure of Test 11 is used to treat the slurry at 17.2% of dry weight of crushed calcium carbonate, with 0.5% by weight of polyacrylate dispersant to obtain a particle size distribution such that 65% of the particles have a diameter of less than 1 micrometer measured using a Sedigraph 5100™ instrument.

The coating test protocol involves the use of an Erichsen Bechcoater™ coating machine on a semi-matt plastic sheet sold by the Mühlebach company of Switzerland.

The two coating colors used have a composition comprising 100 parts of the pigment slurry to be tested and 12 parts of styrene/acrylate basic latex sold by the BASF company under the name ACRONAL S 360 D™.

In the first case, the pigment slurry to be tested corresponds to a slurry of non-treated calcium carbonate with 17.2% in terms of dry matter of crushed calcium carbonate, with 0.5% by weight of a polyacrylate dispersant to obtain a particle size distribution such that 65% of the particles have a diameter of less than 1 micrometer measured using a Sedigraph 5100™ instrument.

In the second case, the pigment slurry to be tested corresponds to a slurry with 17.2% in terms of dry matter of crushed calcium carbonate treated according to the preceding operating procedure.

The results of thickness measurements in the three tests correspond to (1) the plastic base (2) the base coated with the above non-treated slurry of calcium carbonate and (3) the base coated with the above treated slurry of calcium carbonate. These results are shown in the following Table and FIG. 2.

| | Non-coated base Thickness in microns | Coated with non-treated CaCO3 Thickness in microns | Coating weight g/m2 | Coating with CaCO3 according to the invention Thickness in microns | Coating weight g/m2 |
|---|---|---|---|---|---|
| | 79.59 | | | | |
| Blade 3 | | 81.19 | 4.78 | 95.19 | 4.28 |
| Blade 4 | | 83.19 | 8.44 | 104.1 | 7.09 |
| Blade 5 | | 85.19 | 11.09 | 109.59 | 8.78 |

An examination of the above Table shows that:
in the absence of coating, the paper thickness is 79.59
with a conventional coating, the paper thickness is only 81.19 for a weight of 4.78 g/m²
with a coating using the preparation according to the invention, the paper thickness increases very considerably to 95.19 for a weight of 4.28 g/m².

We naturally obtain the coating thickness from the difference between the thickness of the coated paper and that of the non-coated paper.

The increase in coating thickness is therefore 15.6 microns between the coating with the product according to the invention and the non-treated paper (95.19 against 79.59) and the thickness of the paper is 79.5 for a weight of 4.28 g/m² against only 1.6 between a coating with a traditional preparation and the non-treated paper (81.19 against 79.59) for a weight of 4.78 g/m².

The increase in thickness (seen in the form of the property known as "bulk") is thus, when using a preparation according to the present invention, approximately 10 times greater for approximately the same weight.

Figure 2:
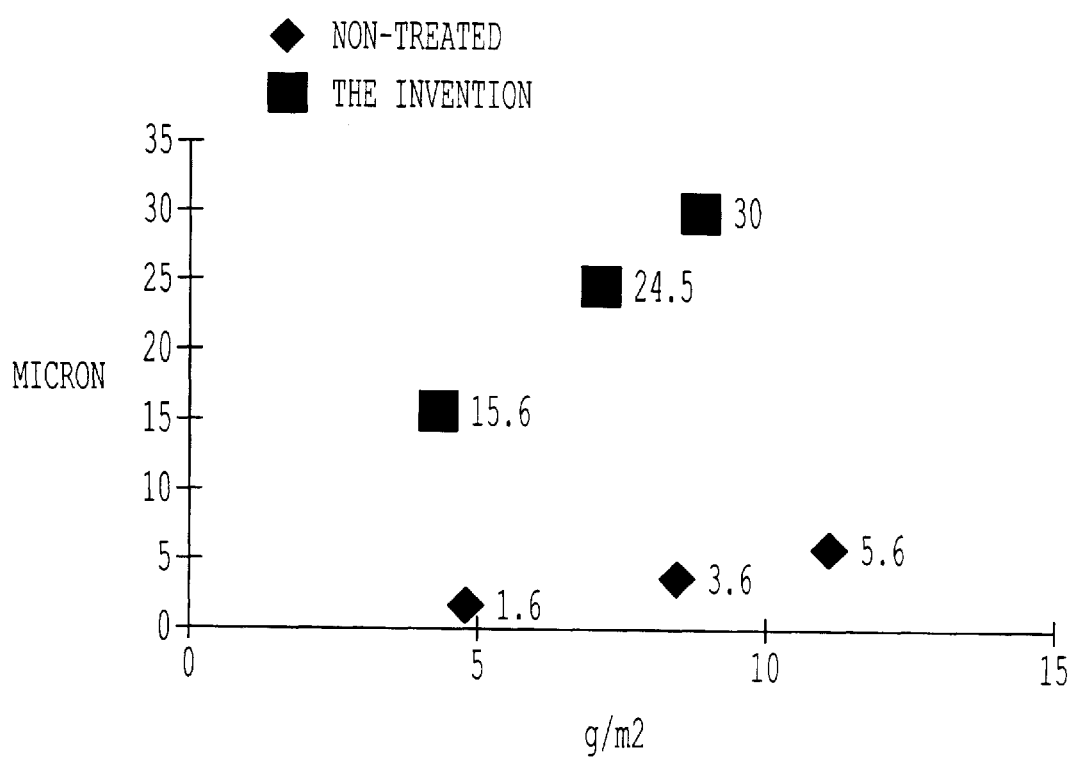
FIG. 2 is a graph of thickness against weight for treated and non-treated calcium carbonate.

The same type of calculation for different weights allows us to produce FIG. 2, which shows thickness in micrometers against weight in g/m².

Interpretation of FIG. 2 shows that in the control (i.e. non-treated) test, the gradient of the coating thickness is 0.5 $\mu m.g^{-1}.m^{-2}$ whereas in the test of the invention the gradient of coating is 3.5 $\mu m.g^{-1}.m^{-2}$.

We see that we obtain better coverage of the sheet, better calendrability and a greater volume of pores thanks to the use of the product according to the present invention.

Test No. 13:

This test illustrates the invention and employs 150 g dry weight of a filter cake of Norwegian marble with granulometry such that 65% of the particles have a diameter of less than $1\mu$ measured using a Sedigraph 5100™ instrument from Micrometrics, containing 0.5% by weight of sodium polyacrylate with specific viscosity equal to 0.75, diluted to 20% with water. One liter of the product is prepared in a glass reactor and heated to 70° C. Over a period of 1 hour, a quantity of hydrochloric acid is added drop-by-drop in the form of a 10% aqueous solution corresponding to 0.507 moles of $H_3O^+$ per mole of $CaCO_3$. The product obtained is then allowed to react again for 30 minutes by recycling of internal $CO_2$ and injection of $CO_2$ at the bottom of the reactor, and is then stored in a horizontal position on two rotary cylinders at a pH of 7.6.

After 24 hours of storage, the sheets of paper are formed with the same operating mode as in Test no. 1, at 75 g/m². The thickness is also measured with the same method as in Test no. 1.

The results are:
a) For the pigment:
5 hours after the end of treatment of the natural calcium carbonate in the test, the pH of the slurry is 7.6, which signifies no stability towards acids.

b) For the paper:
The thickness measurements are:
For the initial sample, the control with no treatment of filler: 114 $\mu$m at 75 g/m²
For the test sample: 120 $\mu$m at 75 g/m², which equates to 71.2 g/m² for a thickness of 114 $\mu$m.

We see that in this test, if the paper thickness is brought to a common value of 114 $\mu$m, we gain 3.8 g/m² or 5% of the weight of the paper, which means a significant gain in environmental terms.

Test No. 14:

This test illustrates the invention and employs 150 g dry weight of a filter cake of Norwegian marble with granulometry such that 65% of the particles have a diameter of less than $1\mu$ measured using a Sedigraph 5100™ instrument from Micrometrics, containing 0.5% by weight of sodium polyacrylate with specific viscosity equal to 0.75, diluted to 20% with water. One liter of the product is prepared in a glass reactor and heated to 70° C. Over a period of 1 hour, a quantity of oxalic acid with two moles of crystallised water ($2H_2O$) is added drop-by-drop in the form of a 10% aqueous solution corresponding to 0.335 moles of $H_3O^+$ per mole of $CaCO_3$.

The product obtained is then made to react again for 30 minutes by recycling of internal $CO_2$ and injection of $CO_2$ at the bottom of the reactor, and is then stored in a horizontal position on two rotary cylinders at a pH of 7.7.

After 24 hours of storage, the sheets of paper are formed with the same operating mode as in Test no. 1, at 75 g/m². The thickness is also measured with the same method as in Test no. 1.

The results are:
a) For the pigment:
5 hours after the end of treatment of the natural calcium carbonate in the test, the pH of the slurry is 8.0, which signifies no stability towards acids.

b) For the paper:
The thickness measurements are:
For the initial sample, the control: 114 $\mu$m at 75 g/m²
For the test sample: 121 $\mu$m at 75 g/m², which equates to 70.4 g/m² for a thickness of 114 $\mu$m.

We see that in this test, if the paper thickness is brought to a common value of 114 $\mu$m; we gain 4.6 g/m² or 6.1% of the weight of the paper, which means a significant gain in environmental terms.

EXAMPLE 2

This example concerns the treatment of slurries with a high dry matter content.

For all the tests of Example 2, the mineral is prepared in the form of a suspension ("slurry") of which the solid or dry matter content may be up to 80% by weight, or in the form of a filter cake, or in the form of a dry powder, in a suitable reactor. If necessary the preparation is diluted to the required level of dry matter using distilled water or tap water.

Test No. 15:

For the purposes of this test, which illustrates the prior art, an aqueous composition is prepared by introducing the following into a mixer under agitation:
750 dry grams of Norwegian marble with granulometry such that 75% of the particles have a diameter of less than $1\mu$ measured using a Micrometrics Sedigraph 5100™ instrument
250 dry grams of a talc from Finland with granulometry such that 45% of the particles have a diameter of less than $2\mu$ measured using a Micrometrics Sedigraph 5100™ instrument 5 dry grams of an acrylic binding agent composed of 90% by weight of acrylic acid and 10% by weight of tristyrylphenol methacrylate with 25 moles of ethylene oxide.

the quantity of water required to form an aqueous preparation with a 65% concentration of dry matter.

After 30 minutes of agitation and formation of the co-structure between the particles of marble and talc with the help of the binding agent, we add 5.2 grams of a polyacrylate partially neutralised with soda and having a specific viscosity equal to 0.5, together with additional water and soda in order to obtain an aqueous preparation with a 65% concentration of dry matter.

Sheets are formed at 75 g/m$^2$ using the same operating procedure as in Test no. 1 and their thickness is measured, also using the same method as in Test no. 1. The thickness measured is 116 μm for a weight of 75 g/m$^2$.

Test No. 16:

For this test, which illustrates the prior art, we use the same operating procedure as in Test no. 1 to make sheets of paper with a weight of 75 g/m$^2$ from an aqueous suspension with a dry matter content of 77.5% of a Norwegian marble with granulometry such that 63% of the particles have a diameter of less than 1μ measured using a Micrometrics Sedigraph 5100™ instrument.

The thickness measured is 115 μm for a weight of 75 g/m$^2$.

The opacity is 86.4, measured using the same operating procedure as in Test no. 2 and in accordance with the DIN 53 146 Standard.

The brightness is 88.4, measured using the same operating procedure as in Test no. 2 and in accordance with the ISO Brightness R 457 Tappi Filter Standard.

Test No. 17:

For this test, which illustrates the prior art, we use the same operating procedure as in Test no. 1 to make sheets of paper with a weight of 75 g/m$^2$ from an aqueous suspension with a dry matter content of 67.2% of a Norwegian marble filter cake with granulometry such that 75% of the particles have a diameter of less than 1μ measured using a Micrometrics Sedigraph 5100™ instrument, containing 0.5% by dry weight of a sodium polyacrylate with a specific viscosity equal to 0.75.

The thickness measured is 114 μm for a weight of 75 g/m$^2$.

Test No. 18:

For this test, which illustrates the invention, we prepare 4000 g of the preparation of Test no. 15, which is a mixture of 25% by dry weight of talc and 75% by dry weight of CaCO$_3$ originating from Norwegian marble, in the form of a suspension with a concentration of dry matter equal to 59.4%, in a Lödiger fluidised-bed mixer, and we add over 45 minutes, drop-by-drop, a quantity of phosphoric acid in the form of a 20% aqueous solution corresponding to 0.15 moles of H$_3$O+ per mole of CaCO$_3$.

After the treatment, the Lödiger mixer continues to operate for 1 hour. This fluidised-bed device, continuing to rotate, allows an exchange to occur between the air and the carbon dioxide produced by the reaction, implying also the presence of carbon dioxide in the atmosphere within the apparatus.

The product obtained is then stored in a horizontal position on two rotary cylinders at a pH of 7.6.

After 24 hours of storage, the sheets of paper are formed with the same operating mode as in Test no. 1, at 75 g/m$^2$. The thickness is also measured with the same method as in Test no. 1.

The results are:
a) For the pigment:
5 hours after the end of treatment of the natural calcium carbonate in the test, the pH of the slurry is 7.8, which signifies no stability towards acids.
b) For the paper:
The thickness measurements are:
For the initial sample, the control Test no. 15): 116 μm at 75 g/m$^2$
For the test sample: 118 μm at 75 g/m$^2$, which equates to 73.9 g/m$^2$ for a thickness of 116 μm.

We see that in this test, if the paper thickness is brought to a common value of 116 μm, we gain 1.1 g/m$^2$ or 1.5% of the weight of the paper, which means a significant gain in environmental terms.

Test No. 19:

For this test, which illustrates the invention, we prepare 3290 g of the preparation of Test no. 16, which is a calcium carbonate originating from Norwegian marble, in the form of a slurry with a concentration of dry matter equal to 75.8%, in a Lödiger fluidised-bed mixer, and we add over 2 hours, drop-by-drop, a quantity of phosphoric acid in the form of a 20% aqueous solution corresponding to 0.5 moles of H$_3$O+ per mole of CaCO$_3$.

After the treatment, the Lödiger mixer continues to operate for 1 hour. This fluidised-bed device, continuing to rotate, allows an exchange to occur between the air and the carbon dioxide produced by the reaction, implying also the presence of carbon dioxide in the atmosphere within the apparatus.

The product is then stored in a horizontal position on two rotary cylinders at a pH of 7.6.

After 24 hours of storage, the sheets of paper are formed with the same operating mode as in Test no. 1, at 75 g/m$^2$. The thickness is also measured with the same method as in Test no. 1.

The results are:
a) For the pigment:
7 hours after the end of treatment of the natural calcium carbonate in the test, the pH of the slurry is 7.6, which signifies no stability towards acids.
b) For the paper:
The thickness measurements are:
For the initial sample, the control (Test no. 16): 115 μm at 75 g/m$^2$
For the test sample: 130 μm at 75 g/m$^2$, which equates to 66.5 g/m$^2$ for a thickness of 115 μm.

We see that in this test, if the paper thickness is brought to a common value of 115 μm, we gain 8.5 g/m$^2$ or 11.3% of the weight of the paper, which means a significant gain in environmental terms.

Test No. 20

For this test, which illustrates the invention, we mix 1600 g of a mixture of calcium carbonate originating from Norwegian marble, with granulometry such that 75% of the particles have a diameter of less than 1 μm determined by a Sedigraph 5100 measurement, presenting certain properties in the non-dispersed state, in the form of a filter cake, with 400 g of another different carbonate obtained according to Test 18 above, at a dry matter concentration of 52.8% (cf. above) in a Lödige fluidised-bed machine for 30 minutes and thereafter we disperse using 0.5% by dry weight of a sodium polyacrylate dispersant with a specific viscosity equal to 0.75, then the concentration is adjusted to 60%. The product is then stored in a horizontal position on two rotary cylinders at a pH of 8.5.

After 24 hours of storage, the sheets of paper are formed with the same operating mode as in Test no. 1, at 75 g/m². The thickness is also measured with the same method as in Test no. 1.

The results are:
a) For the pigment:
5 hours after the end of treatment of the natural calcium carbonate in the test, the pH of the slurry is 8.5, which signifies no stability towards acids.
b) For the paper:
The thickness measurements are:
For the initial sample, the control (Test no. 17): 114 μm at 75 g/m²
For the test sample: 118 μm at 75 g/m², which equates to 72.2 g/m² for a thickness of 114 μm.

We see that in this test, if the paper thickness is brought to a common value of 114 μm, we gain 2.8 g/m² or 3.7% of the weight of the paper, which means a significant gain in environmental terms.

Test No. 21:
For this test, which illustrates the invention, we mix 1200 g of a mixture of calcium carbonate originating from Norwegian marble, with granulometry such that 65% of the particles have a diameter of less than 1 μm determined by a Sedigraph 5100 measurement, presenting certain properties in the non-dispersed state, in the form of a filter cake, with 300 g of another different carbonate treated according to Test 18 above, at a dry matter concentration of 52.8% in the presence of water to obtain a concentration of 60%. Mixing takes place in a Lödige fluidised-bed machine for 30 minutes and we add 500 g of talc of Finnish origin and of granulometry such that 35% of the particles have a diameter of less than 1 μm determined by the Sedigraph 5100, the talc having previously treated with 1.2% of an acrylic copolymer binder and water in order to obtain a concentration of 60%. We then mix again for 30 minutes under injected $CO_2$ at a flow rate of 100 ml/minute and thereafter we disperse using 0.5% by dry weight of a sodium polyacrylate dispersant with a specific viscosity equal to 0.75. The product is then stored in a horizontal position on two rotary cylinders at a pH of 8.4.

After 24 hours of storage, the sheets of paper are formed with the same operating mode as in Test no. 1, at 75 g/m². The thickness is also measured with the same method as in Test no. 1.

The results are:
a) For the pigment:
5 hours after the end of treatment of the natural calcium carbonate in the test, the pH of the slurry is 8.5, which signifies no stability towards acids.
b) For the paper:
The thickness measurements are:
For the initial sample, the control: 114 μm at 75 g/m²
For the test sample: 116 μm at 75 g/m², which equates to 73.5 g/m² for a thickness of 114 μm.

We see that in this test, if the paper thickness is brought to a common value of 114 μm, we gain 1.5 g/m² or 2% of the weight of the paper, which means a significant gain in environmental terms.

Test No. 22:
For this test, which illustrates the invention, we introduce $CO_2$ into the slurry obtained according to the previous Test at a flow rate of 100 ml/minute for 5 hours, the product obtained then being stored in a horizontal position on two rotary cylinders at a pH of 8.1.

After 24 hours of storage, the sheets of paper are formed with the same operating mode as in Test no. 1, at 75 g/m². The thickness is also measured with the same method as in Test no. 1.

The results are:
a) For the pigment:
5 hours after the end of treatment of the natural calcium carbonate in the test, the pH of the slurry is 8.1, which signifies no stability towards acids.
b) For the paper:
The thickness measurements are:
For the initial sample, the control: 114 μm at 75 g/m²
For the test sample: 117 μm at 75 g/m², which equates to 73.1 g/m² for a thickness of 114 μm.

We see that in this test, if the paper thickness is brought to a common value of 114 μm, we gain 1.9 g/m² or 2.5% of the weight of the paper, which means a significant gain in environmental terms.

Test No. 23:
For this test, which illustrates the invention, we prepare 6000 g of Norwegian marble calcium carbonate with granulometry such that 65% of the particles have a diameter of less than 1μ measured using a Sedigraph 5100™ instrument from Micrometrics, in the form of a suspension or slurry with a concentration of 77.8% by weight of dry matter in a Lödige fluidised-bed mixer, and then dilute with water to a concentration of 75.7%. We then add, drop-by-drop over 45 minutes, 0.15 moles of $H_3O^+$ per mole of $CaCO_3$, using phosphoric acid in the form of a 20% aqueous solution.

$CO_2$ is then bubbled through the product for 5 hours at a flow rate of 100 ml/minute before the product obtained is stored for first 1 week then 4 weeks in a horizontal position on two rotary cylinders.

The results are:
a) For the pigment:
3 hours after the end of treatment of the natural calcium carbonate in the test, the pH of the slurry is 7.6, whereas after 1 week and 4 weeks the pH is 7.8, which signifies no stability towards acids.
b) For the paper:
After 1 week of storage, the sheets of paper are formed with the same operating mode as in Test no. 1, at 75 g/m², and the thickness is measured with the same method as in Test no. 1.
The thickness measurements are:
For the initial sample, the control: 115 μm at 75 g/m²
For the test sample: 119 μm at 75 g/m², which equates to 72.2 g/m² for a thickness of 115 μm.

We see that in this test, if the paper thickness is brought to a common value of 115 μm, we gain 2.8 g/m² or 3.7% of the weight of the paper, which means a significant gain in environmental terms.

After 4 weeks of storage, the sheets of paper are formed with the same operating mode as in Test no. 1, at 75 g/m², and the thickness is measured with the same method as in Test no. 1.
The thickness measurements are:
For the initial sample, the control: 115 μm at 75 g/m²
For the test sample: 119 μm at 75 g/m², which equates to 72.2 g/m² for a thickness of 115 μm.

We see that in this test, if the paper thickness is brought to a common value of 115 μm, we gain 2.8 g/m² or 3.7% of the weight of the paper, which means a significant gain in environmental terms.

Test No. 24:
This Test illustrates the invention and the recirculation of carbon dioxide using a Silverson rotor/stator mixer.

In a pilot unit of 1 m3 with a height of 2 m, we first introduce into a reactor equipped with Silverson agitation 284 liters of slurry with a dry matter concentration of 27% of natural calcium carbonate originating from Carrare marble with granulometry such that 65% of the particles have a diameter of less than 1 μm measured by means of the Sedigraph 5100, at 62° C., which has been diluted with the required quantity of water to obtain a suspension at a dry matter concentration of 23.1%, then we mix with a quantity of $H_3PO_4$ in a 50% solution corresponding to 0.26 moles of $H_3O^+$ per mole of $CaCO_3$. The temperature at the beginning of addition of the acid, which takes 1 hour 45 minutes, is 52° C. This is done by hand from a beaker. The quantity of water added with the acid used gives us a slurry with a 15.8% concentration of dry matter.

The slurry is then treated for 4 hours per 60 kg by recirculation of $CO_2$ in the container with Silverson agitation containing approximately 50 liters.

The results are:

a) For the pigment:
   5 hours after the end of treatment of the natural calcium carbonate in the test, the pH of the slurry is 7.7, which signifies no stability towards acids.

b) For the paper:
   The thickness measurements are:
   For the initial sample, the control: 117 μm at 75 g/m²
   For the test sample: 126 μm at 75 g/m², which equates to 69.6 g/m² for a thickness of 117 μm.

We see that in this test, if the paper thickness is brought to a common value of 117 μm, we gain 5.4 g/m² or 7.2% of the weight of the paper, which means a significant gain in environmental terms.

Test No. 25:

This test illustrates the invention and the processing of "coating broke".

To do this we disperse in water, under agitation and for 30 minutes, so as to obtain a concentration of "coating broke" of 10% by weight, 800 grams of "coating broke" of 100 g/m² quality with a filling rate of approximately 15% by weight, corresponding to 120 dry grams of natural Finnish marble calcium carbonate with granulometry such that 35% of the particles have a diameter of less than 1μ measured using a Sedigraph 5100™ and coated at a rate of 25 g/m² per side, with 400 grams by dry weight of natural Finnish marble calcium carbonate with granulometry such that 80% of the particles have a diameter of less than 1μ measured using a Sedigraph 5100™, this marble having been ground using 0.8% by dry weight of a sodium polyacrylate dispersing and grinding agent and a styrene-butadiene latex coating binding agent.

When dispersion is complete, we treat the slurry in a 10 liter glass reactor at a dry matter concentration of 10% by weight at a temperature of 55° C. using phosphoric acid in a solution of 50% by weight corresponding to 0.4 moles of $H_3O^+$ per mole of $CaCO_3$. $CO_2$ is then bubbled through the slurry and fibres at atmospheric pressure for 5 hours such that the ratio volume of suspension:volume of gaseous $CO_2$ is approximately equal to 1:0.1.

The sheets of paper are formed with the same operating mode as in the preceding Tests by mixing treated "coating broke" with fresh fibres so as to obtain a rate of filling of 20% by weight for the final paper.

The results are:

a) For the pigment:
   5 hours after the end of treatment of the natural calcium carbonate in the test, the pH of the slurry of "coating broke" is 7.6, which signifies no stability towards acids.

b) For the paper:
   The thickness measurements are:
   For the initial sample, the control (prepared as the sample without treatment by acid and gaseous CO2): 115 μm at 75 g/m²
   For the test sample: 123 μm at 75 g/m², which equates to 70.1 g/m² for a thickness of 115 μm.

We see that in this test, if the paper thickness is brought to a common value of 115 μm, we gain 4.9 g/m² or 6.5% of the weight of the paper, which means a significant gain in environmental terms.

Test No. 26:

For this test, which illustrates the invention, we prepare 447 g of the preparation of Test no. 16, which is a calcium carbonate originating from Norwegian marble, in the form of a slurry with a concentration of dry matter equal to 75.8%, in a Lödiger fluidised-bed mixer, and we add over 2 hours, drop-by-drop, a quantity of phosphoric acid in the form of a 20% aqueous solution corresponding to 0.3 moles of $H_3O+$ per mole of $CaCO_3$.

Once the treatment with phosphoric acid is complete, the product is stored for 3 hours, during which time the $CO_2$ treatment takes place by internal recirculation of gaseous $CO_2$.

The product is then stored in a horizontal position on two rotary cylinders and the pH is equal to 7.8 after 5 hours.

After 24 hours of storage, the sheets of paper are formed with the same operating mode as in Test no. 1, at 75 g/m², but with a pigment load of 25%. The thickness is also measured with the same method as in Test no. 1.

The BET specific surface area is 11.5 m²/g, determined using the same method as in Test no. 11.

The results of the thickness measurements are:
for the initial sample (control i.e. Test no. 13 with a pigment load of 25%): 114 μm at 75 g/m².
for the test sample: 119 μm at 75 g/m², which equates to 71.8 g/m² at a thickness value of 114 μm.

We see that in this test, if the paper thickness is brought to a common value of 114 μm, we gain 3.2 g/m² or 4.3% of the weight of the paper, which signifies a considerable economy in terms of the environment.

The results of measurements of rupture length, determined in accordance with the DIN EN ISO 1924-2 Standard, including the DIN 53112-1 Standard, are:
for the initial control sample (Test no. 13 with a pigment load of 25%): 2.22 km
for the test sample with a pigment load of 25%: 2.54 km, signifying an increase in rupture length of 14.4% relative to the non-treated product, at 75 g/m².

Furthermore, the resistance to traction, determined in accordance with the DIN EN ISO 1924-2 Standard for a size of 15 mm is 28 N for the test sample against only 24.5 N for the control.

The opacity is 86.6, determined using the same operating procedure as in Test no. 2 and in accordance with DIN 53 146.

The brightness is 89.0, measured using the same operating procedure as in Test no. 2 and in accordance with the ISO Brightness R 457 Tappi Filter Standard.

Test No. 27:

For this Test, which illustrates the invention, we prepare 447 kg of the preparation in Test no. 16 but with granulometry such that only 40% of the particles by weight have a diameter of less than 1μ measured using a Micrometrics Sedigraph 5100™ instrument, in the form of a slurry of Norwegian marble calcium carbonate with a concentration of dry matter equal to 75.8%, in a Lödiger fluidised-bed mixer, and we add over 2 hours, drop-by-drop, a quantity of phosphoric acid in the form of a 20% aqueous solution corresponding to 0.3 moles of $H_3O+$ per mole of $CaCO_3$.

The product is then stored in a horizontal position on two rotary cylinders at a pH of 7.6.

After 24 hours of storage, the sheets of paper are formed with the same operating mode as in Test no. 1, at 75 g/m², but with a pigment load of 25%. The thickness is also measured with the same method as in Test no. 1.

The BET specific surface area is 9.8 m²/g, determined using the same method as in Test no. 11.

The results of the thickness measurements are:

for the initial sample (control i.e. test no. 11 with a pigment load of 25%): 114 µm at 75 g/m².

for the test sample: 121 µm at 75 g/m², which equates to 70.7 g/m² at a thickness value of 114 µm.

We see that in this test, if the paper thickness is brought to a common value of 114 µm, we gain 4.3 g/m² or 5.7% of the weight of the paper, which signifies a considerable economy in terms of the environment.

The results of measurements of rupture length, determined in accordance with the DIN EN ISO 1924-2 Standard, including the DIN 53112-1 Standard, are:

for the initial control sample (test no. 11 with a pigment load of 25%): 2.30 km for the test sample with a pigment load of 25%: 2.48 km, signifying an increase in rupture length of 8.7% relative to the non-treated product, at 75 g/m².

Furthermore, the resistance to traction, determined in accordance with the DIN EN ISO 1924-2 Standard for a size of 15 mm is 27.3 N for the test sample against only 24.5 N for the control.

The opacity is 87.7, determined using the same operating procedure as in Test no. 2 and in accordance with DIN 53 146.

The brightness is 89.0, measured using the same operating procedure as in Test no. 2 and in accordance with the ISO Brightness R 457 Tappi Filter Standard.

The same test sample is then coated onto a wood-based paper 53 µm thick with a grammage of 32.9 g/m²±0.39%, using a laboratory coating machine (Dixon Helicoater).

A short dwell head is used with a blade angle of 45°. The coating speed is 800 m/s.

The coating colors employed are made up of 100 pph of the pigment to be tested, 12 pph of latex (DL 966 styrene/butadiene) and 0.5 pph of carboxymethyl cellulose (Finnfix FF5) with a dry matter content of 56.6%.

The results obtained are as follows:

Thickness of non-coated paper: 53 µm

Thickness of paper coated at 7 g/m² for the control sample of Test no. 13: 56 µm Thickness of paper coated at 7 g/m² for the present Test, according to the invention: 59 µm Thickness of coating at 7 g/m² for the control sample of Test no. 13: 3 µm Thickness of coating at 7 g/m² for the present Test: 6 µm These results show that the coating thickness can be increased by a factor of two relative to the control.

EXAMPLE 3

This example involves using, with an ink jet printer, a treated or non-treated calcium carbonate as a filler in the paper.

We dilute 0.5 kg, calculated on the basis of dry pigment, of natural Norwegian marble calcium carbonate with granulometry such that 75% of the particles by weight have a diameter of less than 1µ measured using a Sedigraph 5100™ instrument from Micrometrics, in the form of a filter cake, using distilled water in the 10 liter container until a slurry is obtained with a concentration of 15% by weight of dry matter. The slurry thus formed is then treated using phosphoric acid in a solution of 10% by weight at 65° C. under agitation for 20 minutes at 500 revolutions per minute. After 15 minutes $CO_2$ is bubbled through the suspension for 1 hour.

Once $CO_2$ bubbling is complete, sheets of paper are formed using as a filler the slurry of calcium carbonate to be tested.

In order to do this we make sheets of paper from a pulp or paste with an SR value of 23 containing a sulphated paste of wood and fibres composed of 80% of birch and 20% of pine. We then dilute 45 dry grams of this pulp or paste in 10 liters of water in the presence of approximately 15 dry grams of the filler preparation to be tested in order to obtain experimentally a filler content of 20% within 0.5%. After 15 minutes of agitation and adding 0.06% by dry weight, relative to the dry weight of the paper, of a polyacrylarnide retaining agent, we form a sheet with a grammage of 75 g/m² filled to (20±0.5)%. The system used to form the sheet is a Rapid-Köthen model 20.12 MC from the Haage company.

The sheets thus formed are dried for 400 seconds at 92° C. and under a vacuum of 940 mbar.

The filler content is checked by ash analysis.

The sheet being thus formed, the thickness is measured. The thickness of the paper or board sheet is the perpendicular distance between two parallel surfaces.

The samples are conditioned for 48 hours (German Standard DIN EN 20187).

This Standard specifies that paper is a hygroscopic substance and as such presents the characteristics of being able to adapt its moisture content in order to match it to that of the ambient air. Moisture is absorbed when the ambient air undergoes an increase in humidity and is in contrast released when the ambient air undergoes a decrease in humidity.

Even if the relative humidity remains constant, the moisture content of the paper does not necessarily remain constant if the temperature is not maintained at a constant value within certain limits. When an increase or a decrease in the humidity content occurs, the physical properties of the paper are modified.

For this reason, the samples must be conditioned for a period of at least 48 hours in order for equilibrium to be reached. The samples are also tested under identical climatic conditions.

The test climate for the paper is defined as follows:

| Relative humidity | 50% (±3) |
|---|---|
| Temperature | 23° C. (±1) |

The thickness is determined in accordance with the German Standard DIN EN 20534 using a micrometer of which the test print is 10 N/cm². The test result is determined from the mean of 10 measurements and is expressed in micrometers. The control is a paper manufactured simultaneously in the same manner with the same quantity of filler, non-treated, at 75 g/m² and the same batch of cellulose.

The results are:
a) For the pigment:
12 hours after the end of treatment of the natural calcium carbonate as in the test, the pH of the slurry is 7.2, which signifies no stability towards acids.
b) For the paper:
The thickness measurements are:
For the initial sample, the control: 112 $\mu$m at 75 g/m$^2$
For the test sample: 120 $\mu$m at 75 g/m$^2$, which equates to 70 g/m$^2$ for a thickness of 112 $\mu$m.

We see that in this test, if the paper thickness is brought to a common value of 112 $\mu$m, we gain 5 g/m$^2$ or 6.6% of the weight of the paper, which means a significant gain in environmental terms.

Printing characteristics:
If ink jet printing is performed comparing a product from the prior art (FIG. 1B) with this test according to the invention (FIG. 1A) on an EPSON™ Stylus COLOR 500™ ink jet printer, we see that printing according to the invention is much sharper.

EXAMPLE 4

This example involves using, with an ink jet printer, a treated or non-treated calcium carbonate as a filler in the paper and as a coating.

We dilute 0.5 kg, calculated on the basis of dry pigment, of natural Norwegian marble calcium carbonate with granulometry such that 75% of the particles have a diameter of less than 1$\mu$ measured using a Sedigraph 5100™ instrument from Micrometrics, in the form of a filter cake, using distilled water in the 10 liter container until a slurry is obtained with a concentration of 15% by weight of dry matter. The slurry thus formed is then treated using phosphoric acid in a solution of 10% by weight at 65° C. under agitation for 20 minutes at 500 revolutions per minute. After 15 minutes $CO_2$ is bubbled through the suspension for 1 hour.

Coating Protocol:
We use the same protocol as in Test 27 above i.e. the test sample is coated onto a wood-based paper 53 $\mu$m thick with a grammage of 32.9 g/m$^2$±0.39%, using a laboratory coating machine (Dixon Helicoater).

A short dwell head is used with a blade angle of 45°. The coating speed is 800 m/s.

The coating compounds employed are made up of 100 pph of the pigment to be tested, 12 pph of latex (DL 966 styrene/butadiene) and 0.5 pph of carboxymethyl cellulose (Finnfix FF5) with a dry matter content of 56.6%.

The samples are conditioned for 48 hours (German Standard DIN EN 20187). This Standard specifies that paper is a hygroscopic substance and as such presents the characteristics of being able to adapt its moisture content in order to match it to that of the ambient air. Moisture is absorbed when the ambient air undergoes an increase in humidity and is in contrast released when the ambient air undergoes a decrease in humidity.

Even if the relative humidity remains constant, the moisture content of the paper does not necessarily remain constant if the temperature is not maintained at a constant value within certain limits. When an increase or a decrease in the humidity constant occurs, the physical properties of the paper are changed.

For this reason, the samples must be conditioned for a period of at least 48 hours in order for equilibrium to be reached. The samples are also tested under identical climatic conditions.

The test climate for the paper is defined as follows:

| | |
|---|---|
| Relative humidity | 50% (±3) |
| Temperature | 23° C. (±1) |

The thickness is determined in accordance with the German Standard DIN EN 20534 using a micrometer of which the test print is 10 N/cm$^2$. The test result is determined from the mean of 10 measurements and is expressed in micrometers. The control is a paper manufactured simultaneously in the same manner with the same quantity of filler, non-treated, at 75 g/m$^2$ and the same batch of cellulose.

The results are:
a) For the pigment:
12 hours after the end of treatment of the natural calcium carbonate as in this example, the pH of the slurry is 7.2, which signifies no stability towards acids.
b) For the paper:
The thickness measurements are:
For the initial sample, the control: 112 $\mu$m at 75 g/m$^2$
For the test sample: 120 $\mu$m at 75 g/m$^2$, which equates to 70 g/m$^2$ for a thickness of 112 $\mu$m.

We see that in this test, if the paper thickness is brought to a common value of 112 $\mu$m, we gain 5 g/m$^2$ or 6.6% of the weight of the paper, which means a significant gain in environmental terms.

Measurements of print density are made according to the following operating procedure. Table I shows the results.

The optical density is a measurement of the density of reflection of an image. Using an operating procedure mainly developed by the manufacturer Hewlett-Packard Corporation (HP)™, a specific pattern is printed on the paper and, using a Macbeth RD 918™ reflection densitometer, optical density measurements are made of the pure black colour, the composite black colour, and the cyan, magenta and yellow colours.

Unless otherwise stated, this protocol is valid for all the examples which involve this measurement.

The tests of the said Table I are performed on a cellulose paper or on a special paper, with a product composed of 100 parts of the pigment to be tested, 15 parts of PVA (polyvinyl alcohol) and 5 parts of Stockhausen PK-130 additive, the filler being to a specific surface area of 70 m$^2$/g, described as a coarse filler of high specific surface area.

Coating is done using an Erichsen Bench Coater™ on paper as defined in Table I.

The first two tests of Table I correspond to a paper with no pigmentary coating (surface-starched in the paper machine).

The next two tests correspond to a paper treated with synthetic silicates. We observe that it is essential to use a special paper in order to obtain a good optical density.

The final two tests correspond to a paper coated with a preparation according to the invention. We see that at a comparable printing density the invention allows the use of a normal ink jet printing paper rather than a more costly special paper.

We see indeed that the invention is greatly superior to the non-coated paper (1.40 against 1.20 and 1.39 against 1.30) and that the value of 1.40 obtained according to the invention on a normal paper is absolutely comparable to the value of 1.40 obtained using the earlier technology but on a special paper.

TABLE I

MEASUREMENTS OF INKJET PRINTING DENSITY
TEST RESULTS: MEAN OF 15 MEASUREMENTS

| PAPER | PRINTER | SETTINGS | BLACK PRINT DENSITY | CYAN PRINT DENSITY | MAGENTA PRINT DENSITY | YELLOW PRINT DENSITY |
|---|---|---|---|---|---|---|
| Mühlebach Multiline Top | HP Deskjet 895 Cxi | Normal paper | 1.92 | 1.38 | 1.40 | 1.30 |
| Mühlebach Multiline Top | Epson Stylus Color 500 | Normal paper | 1.74 | 1.50 | 1.28 | 1.20 |
| Epson InkJet Paper 720 dpi | HP Deskjet 895 Cxi | High-whiteness paper for HP ink jet printer | 1.95 | 1.38 | 1.23 | 1.08 |
| Epson InkJet Paper 720 dpi | Epson Stylus Color 500 | Specially-coated paper 720 dpi | 1.94 | 1.80 | 1.55 | 1.44 |
| Coating according to the invention | HP Deskjet 895 Cxi | Normal paper | 1.94 | 1.57 | 1.59 | 1.39 |
| Coating according to the invention | Epson Stylus Color 500 | Normal paper | 1.80 | 1.70 | 1.46 | 1.40 |

EXAMPLE 5

This example involves the use of a treated or non-treated calcium carbonate, with coarse particles but with a high specific surface area, as a filler for paper.

For this test, we dilute 0.5 kg, calculated in terms of dry pigment, of natural Norwegian marble calcium carbonate of granulometry such that 65% by weight of the particles have a diameter of less than 1 micrometer measured using a Micrometrics Sedigraph 5100™ and a BET specific surface area of 15.5 m²/g (measured according to the BET method of the ISO 9277 Standard) in the form of a suspension or slurry with a dry matter concentration of 75% with a sodium polyacrylate dispersant, then we dilute with water until we obtain a slurry with a dry matter concentration of 20% by weight, in the 10 liter container. The slurry thus obtained is then treated with 20%, 30% or 40% of a solution of phosphoric acid at 10% by weight, at 65° C. under slight agitation with a flow rate of 30 liters per minute under atmospheric pressure at the bottom of the container for 2 hours. After 2 hours, $CO_2$ is bubbled through the calcium carbonate suspension for 1 hour.

The filler has the following characteristics:

EXAMPLE 5A

Phosphoric Acid 20% a) For the pigment:

mean granule diameter 7 micrometers measured visually using an electron microscope BET specific surface area 38.5 m²/g measured in accordance with the BET method of the ISO 9277 Standard b) For the paper The thickness measurements are:
For the initial (control) sample (filler not treated): 113 μm at 75 g/m²
For the test sample: 133 μm at 75 g/m², which equates to 63.7 g/m² for a thickness value of 113 μm We see that in this test, if the paper thickness is brought to a common value of 113 μm, we gain 11.3 g/m² or 15.0% of the weight of paper, which represents a significant gain in terms of the environment.

EXAMPLE 5B

Phosphoric Acid 30% a) For the pigment:

mean granule diameter 9 micrometers measured visually using an electron microscope BET specific surface area 44.2 m²/g measured in accordance with the BET method of the ISO 9277 Standard b) For the paper The thickness measurements are:
For the initial (control) sample (filler not treated): 113 μm at 75 g/m²
For the test sample: 139 μm at 75 g/m², which equates to 61.0 g/m² for a thickness value of 113 μm We see that in this test, if the paper thickness is brought to a common value of 113 μm, we gain 14.0 g/m² or 18.7% of the weight of paper, which represents a significant gain in terms of the environment.

EXAMPLE 5C

Phosphoric Acid 40% a) For the pigment:

mean granule diameter 13 micrometers measured visually using an electron microscope BET specific surface area 58.4 m²/g measured in accordance with the BET method of the ISO 9277 Standard b) For the paper The thickness measurements are:
For the initial (control) sample (filler not treated): 113 μm at 75 g/m²
For the test sample: 152 μm at 75 g/m², which equates to 55.7 g/m² for a thickness value of 113 μm We see that in this test, if the paper thickness is brought to a common value of 113 μm, we gain 19.3 g/m² or 25.7% of the weight of paper, which represents a significant gain in terms of the environment.

EXAMPLE 6

This example concerns a process for continuously manufacturing the product according to the invention and the use of a treated or non-treated calcium carbonate, with coarse particles but with a high BET specific surface area, as a filler for the paper.

For this test, we dilute 100 kg, calculated in terms of dry pigment, of natural Norwegian marble calcium carbonate of granulometry such that 65% by weight of the particles have a diameter of less than 1 micrometer measured using a Micrometrics Sedigraph 5100™ and a BET specific surface area of 15.5 $m^2/g$ (measured according to the BET method of the ISO 9277 Standard) in the form of a suspension or slurry with a dry matter concentration of 75% with a sodium polyacrylate dispersant, with water until we obtain a slurry with a dry matter concentration of 10% by weight, in the 3000 liter container. The slurry thus obtained is then treated with 10%, 20% or 30% of a solution of phosphoric acid at 15% by weight, at 65° C. continuously in 4 cells of 25 liters, measuring ¼ of the phosphoric acid into each cell under slight agitation with a flow rate of 50 liters per minute under atmospheric pressure at the bottom of each cell. The product is retained in each of the cells for 15 minutes.

The filler has the following characteristics:

EXAMPLE 6A

Phosphoric Acid 10% a) For the pigment:

Slurry concentration: 7.8%
    mean granule diameter 1.7 micrometers measured using a Micrometrics Sedigraph 5100™
    BET specific surface area 36.0 $m^2/g$ measured in accordance with the BET method of the ISO 9277 Standard b) For the paper The thickness measurements are:
    For the initial (control) sample (filler not treated): 113 μm at 75 $g/m^2$
    For the test sample: 123 μm at 75 $g/m^2$, which equates to 68.9 $g/m^2$ for a thickness value of 113 μm We see that in this test, if the paper thickness is brought to a common value of 113 μm, we gain 6.1 $g/m^2$ or 8.1% of the weight of paper, which represents a significant gain in terms of the environment.

EXAMPLE 6B

Phosphoric Acid 19.1% a) For the pigment:

Slurry concentration: 7.8%
    mean granule diameter 12 micrometers measured visually using an electron microscope
    BET specific surface area 49.9 $m^2/g$ measured in accordance with the BET method of the ISO 9277 Standard b) For the paper The thickness measurements are:
    For the initial (control) sample (filler not treated): 113 μm at 75 $g/m^2$
    For the test sample: 135 μm at 75 $g/m^2$, which equates to 62.8 $g/m^2$ for a thickness value of 113 μm We see that in this test, if the paper thickness is brought to a common value of 113 μm, we gain 12.2 $g/m^2$ or 16.6% of the weight of paper, which represents a significant gain in terms of the environment.

EXAMPLE 6C

Phosphoric Acid 30% a) For the pigment:

Slurry concentration: 17.9%
    mean granule diameter 12 micrometers measured visually using an electron microscope
    BET specific surface area 45.7 $m^2/g$ measured in accordance with the BET method of the ISO 9277 Standard b) For the paper The thickness measurements are:
    For the initial (control) sample (filler not treated): 113 μm at 75 $g/m^2$
    For the test sample: 158 μm at 75 $g/m^2$, which equates to 53.6 $g/m^2$ for a thickness value of 113 μm We see that in this test, if the paper thickness is brought to a common value of 113 μm, we gain 21.4 $g/m^2$ or 28.5% of the weight of paper, which represents a significant gain in terms of the environment.

EXAMPLE 6D

This example concerns a process for continuously manufacturing the product according to the invention and the use of a treated or non-treated calcium carbonate, with coarse particles but with a high BET specific surface area, as a filler for the paper.

For this test, we dilute 100 kg, calculated in terms of dry pigment, of natural Norwegian marble calcium carbonate of granulometry such that 65% by weight of the particles have a diameter of less than 1 micrometer measured using a Micrometrics Sedigraph 5100™ and a BET specific surface area of 15.5 $m^2/g$ (measured according to the BET method of the ISO 9277 Standard) in the form of a suspension or slurry with a dry matter concentration of 75% with a sodium polyaspartic acid dispersant, with water until we obtain a slurry with a dry matter concentration of 10% by weight, in the 3000 liter container. The slurry thus obtained is then treated with 10%, 20% or 30% of a solution of phosphoric acid at 15% by weight, at 65° C. continuously in 4 cells of 25 liters, measuring ¼ of the phosphoric acid into each cell under slight agitation with a flow rate of 50 liters per minute under atmospheric pressure at the bottom of each cell. The product is retained in each of the cells for 15 minutes.

The filler has the following characteristics:

a) For the pigment:
    Slurry concentration: 8.9%
        mean granule diameter 1.9 micrometers measured using a Micrometrics Sedigraph 5100™
        BET specific surface area 39.1 $m^2/g$ measured in accordance with the BET method of the ISO 9277 Standard b) For the paper The thickness measurements are:
    For the initial (control) sample (filler not treated): 113 μm at 75 $g/m^2$
    For the test sample: 123 μm at 75 $g/m^2$, which equates to 68.8 $g/m^2$ for a thickness value of 113 μm We see that in this test, if the paper thickness is brought to a common value of 113 μm, we gain 6.2 $g/m^2$ or 8.1% of the weight of paper, which represents a significant gain in terms of the environment.

EXAMPLE 7

This example involves the use of a mixture of treated and non-treated calcium carbonate as a paper filler.

a) Preparation of treated pigment:

We dilute 0.6 kg, calculated in terms of dry pigment, of natural Norwegian marble calcium carbonate of granulometry such that 65% by weight of the particles have a diameter of less than 1 micrometer measured using a Micrometrics Sedigraph 5100™ and a BET specific surface area of 8.4 $m^2/g$ (measured according to the BET method of the ISO 9277 Standard) in the form of a suspension or slurry with a dry matter concentration of 20%, then we dilute with water until we obtain a slurry with a dry matter concentration of 10.2% by weight, in the 1 liter container. The slurry thus obtained is then treated with 70% of a solution of phosphoric acid at 10% by weight, at 60° C. under agitation for 1 hour. After 1 hour, $CO_2$ is bubbled through the calcium carbonate suspension for 30 minutes.

b) Preparation of mixtures of treated and non-treated pigment: mixing with agitation for 15 minutes.

The fillers have the following characteristics:

EXAMPLE 7A

100% of Treated Pigment a) For the pigment:

granulometry such that 21% by weight of the particles have a diameter of less than 1 micrometer measured using a Micrometrics Sedigraph 5100™

BET specific surface area 44.5 $m^2/g$ measured in accordance with the BET method of the ISO 9277 Standard b) For the paper The thickness measurements are:

For the initial (control) sample (filler not treated): 115 $\mu$m at 75 $g/m^2$

For the test sample: 162 $\mu$m at 75 $g/m^2$, which equates to 52.2 $g/m^2$ for a thickness value of 115 $\mu$m We see that in this test, if the paper thickness is brought to a common value of 115 $\mu$m, we gain 22.7 $g/m^2$ or 30.3% of the weight of paper, which represents a significant gain in terms of the environment.

EXAMPLE 7B 21.5% of the Treated Pigment of Example 7A and 78.5% of Non-treated Pigment Result:

a) For the pigment:

granulometry such that 63% by weight of the particles have a diameter of less than 1 micrometer measured using a Micrometrics Sedigraph 5100™

BET specific surface area 15.5 $m^2/g$ measured in accordance with the BET method of the ISO 9277 Standard b) For the paper The thickness measurements are:

For the initial (control) sample (filler not treated): 115 $\mu$m at 75 $g/m^2$

For the test sample: 124 $\mu$m at 75 $g/m^2$, which equates to 69.5 $g/m^2$ for a thickness value of 115 $\mu$m We see that in this test, if the paper thickness is brought to a common value of 115 $\mu$m, we gain 5.5 $g/m^2$ or 7.3% of the weight of paper, which represents a significant gain in terms of the environment.

EXAMPLE 7C 35.5% of the Treated Pigment of Example 7A and 64.5% of Non-treated Pigment a) For the mixture of pigment:

granulometry such that 60.0% by weight of the particles have a diameter of less than 1 micrometer measured using a Micrometrics Sedigraph 5100™

BET specific surface area 20.0 $m^2/g$ measured in accordance with the BET method of the ISO 9277 Standard b) For the paper:

The thickness measurements are:

For the initial (control) sample (filler not treated): 115 $\mu$m at 75 $g/m^2$

For the test sample: 130 $\mu$m at 75 $g/m^2$, which equates to 66.3 $g/m^2$ for a thickness value of 115 $\mu$m We see that in this test, if the paper thickness is brought to a common value of 115 $\mu$m, we gain 8.7 $g/m^2$ or 11.6% of the weight of paper, which represents a significant gain in terms of the environment.

EXAMPLE 7D 50.0% of the Treated Pigment of Example 7A and 50.0% of Non-treated Pigment a) For the mixture of pigments:

granulometry such that 42.0% by weight of the particles have a diameter of less than 1 micrometer measured using a Micrometrics Sedigraph 5100™

BET specific surface area 28.0 $m^2/g$ measured in accordance with the BET method of the ISO 9277 Standard b) For the paper:

The thickness measurements are:

For the initial (control) sample (filler not treated): 115 $\mu$m at 75 $g/m^2$

For the test sample: 137 $\mu$m at 75 $g/m^2$, which equates to 62.9 $g/m^2$ for a thickness value of 115 $\mu$m We see that in this test, if the paper thickness is brought to a common value of 115 $\mu$m, we gain 12.1 $g/m^2$ or 16.0% of the weight of paper, which represents a significant gain in terms of the environment.

EXAMPLE 8

This example involves the use in paint of a treated or non-treated calcium carbonate.

For this test we dilute 5 tonnes, calculated on the basis of dry pigment, of natural Norwegian marble calcium carbonate with granulometry such that 70% of the particles by weight have a diameter of less than $1\mu$ measured using a Sedigraph 5100™ instrument from Micrometrics, in the form of a filter cake, using distilled water in the 45 $m^3$ container until a slurry is obtained with a concentration of 25% by weight of dry matter. The slurry thus formed is then treated using phosphoric acid in a solution of 10% by weight corresponding to 0.20 moles of $H_3O^+$ per mole of $CaCO_3$, at 60° C. and under agitation for 2 hours at 200 revolutions per minute.

After 2 hours $CO_2$ is bubbled at an excess pressure of 50 mbar for 5 hours through the suspension of calcium carbonate such that the ratio volume of suspension:volume of gaseous CO2 is approximately equal to 1:0.15.

After 24 hours of storage, the slurry is dried by a spray dryer and forms an emulsion paint containing as a filler component the dry calcium carbonate to be tested.

Procedure for Preparing the Paint:

In a 1 m³ disperser, the paint is prepared by dispersing the additives and pigments in water for 10 minutes under agitation at 3000 revolutions per minute before reducing the speed to 1000 revolutions per minute and adding the latex. We then disperse for a further 10 minutes.

Formulation of the Paint:

| Formulation A: base 18% $TiO_2$ | kg | Base | 15% $TiO_2$ | 30% $TiO_2$ |
|---|---|---|---|---|
| Mowilith LDM 1871 ca. 53% | kg | 147.0 | 147.0 | 147.0 |
| Tiona RCL-535 | kg | 180.0 | 153.0 | 126.0 |
| Filler | kg | 0.0 | 27.0 | 54.0 |
| OMYACARB 2-GU | kg | 107.0 | 107.0 | 107.0 |
| FINNTALC M 50 | kg | 50.0 | 50.0 | 50.0 |
| OMYACARB 10-GU | kg | 108.0 | 108.0 | 108.0 |
| CALCIMATT | kg | 70.0 | 70.0 | 70.0 |
| Coatex BR 910 G, 10% | kg | 48.5 | 48.5 | 48.5 |
| Coatex P 50 | kg | 3.0 | 3.0 | 3.0 |
| Mergal K 15 | kg | 2.0 | 2.0 | 2.0 |
| Calgon N | kg | 1.0 | 1.0 | 1.0 |
| NaOH, 10% | kg | 2.0 | 2.0 | 2.0 |
| Byk 032 | kg | 3.0 | 3.0 | 3.0 |
| Tylose MH 30 000 YG8 | kg | 3.0 | 3.0 | 3.0 |
| Demineralised water | kg | 275.5 | 275.5 | 275.5 |
| Total | | 1000.0 | 1000.0 | 1000.0 |
| Formulation data | | | | |
| PVC | % | 71.0 | 71.5 | 71.9 |
| Solid density | g/cm³ | 2.48 | 2.44 | 2.41 |
| Liquid density | g/cm³ | 1.56 | 1.55 | 1.55 |
| Solid volume per liter | ml/l | 369 | 372 | 375 |
| Solid volume per kg | m/kg | 236 | 239 | 243 |
| Solid content | % | 60.3 | 60.3 | 60.3 |
| Pigment/binder:solid ratio | | 6.61:1 | 6.61:1 | 6.61:1 |

The paint results are as follows, the control being an aqueous emulsion paint with 18% of $TiO_2$:

| | (Control) 18% $TiO_2$ | 15.3% $TiO_2$ | 12.6% $TiO_2$ |
|---|---|---|---|
| Whiteness (DIN 53140) (liquid thickness 300 μm) | | | |
| Ry on white | 90.8% | 91.1% | 91.2% |
| Ry on black | 89.2% | 89.6% | 89.7% |
| Opacity (ISO 2814) Ry on black/Ry on white * 100 | 98.3% | 98.4% | 98.4% |

The whiteness and opacity of the control are identical with those of the two tests according to the invention with −15% and −30% of TiO2 pigment.

| Dry film thickness | 104 μm | 113 μm | 112 μm |
|---|---|---|---|
| Dry film weight | 177 g/m² | 166 g/m² | 163 g/m² |

We see in this test that in order to produce a thickness of 104 μm as the control, the weight of the film with the calcium carbonate according to the invention is only 153 g/m² and 151 g/m² respectively, against 177 g/m², and if we bring the paint thickness to a common value of 104 μm we gain 24 g/m² and 26 g/m² respectively or 13.5% and 14.7% respectively of the weight of paint, which means a significant gain in environmental terms.

What is claimed is:

1. An aqueous suspension comprising (1) one or more pigments, fillers or minerals, and optionally (2) a dispersant polymer to stabilise the rheology of the suspension, wherein,
   a) said component (1) comprises a natural carbonate and the reaction product or products of said carbonate with gaseous $CO_2$ and the reaction product or products of said carbonate with one or more medium-strong to strong $H_3O^+$ ion-providers, wherein said strong $H_3O^+$ ion-providers are selected from the group consisting of acids having a pKa value of less than or equal to zero at 22° C., and said medium-strong $H_3O^+$ ion-providers are selected from the group consisting of acids having a pKa value of between zero and 2.5 inclusive at 22° C.,
   b) wherein said suspension has a pH greater than 7.5 measured at 20° C., and
   c) wherein the component (1) has a BET specific surface area, measured in accordance with the ISO 9277 Standard, of between 5 m²/g and 200 m²/g.

2. The aqueous suspension according to claim 1 wherein the natural carbonate is a natural calcium carbonate.

3. The aqueous suspension according to claim 1, wherein the strong $H_3O^+$ ion-providers is selected from the group consisting of hydrochloric acid, sulphuric acid and mixtures thereof, and the medium-strong $H_3O^+$ ion-provider is selected from the group consisting of $H_2SO_3$, $HSO_4^-$, $H_3PO_4$, oxalic acid and mixtures thereof.

4. The aqueous suspension according to claim 1, wherein the quantity in moles of the medium-strong to strong $H_3O^+$ ion-provider relative to the number of moles of $CaCO_3$ is in total between 0.1 and 2.

5. The aqueous suspension according to claim 1, wherein the pigment, filler or mineral presents the following characteristics:
   a mean grain diameter, measured by the sedimentation method on a Sedigraph 5100™, between 50 and 0.1 micrometers, and
   a BET specific surface area, measured in accordance with ISO 9277, ranging from 15 m²/g to 200 m²/g.

6. The aqueous suspension according to claim 5, wherein the pigment, filler or mineral presents the following characteristics:
   a mean grain diameter, measured by the sedimentation method on a Sedigraph 5100™, between 7 and 0.7 micrometers, and
   a BET specific surface area, measured in accordance with ISO 9277, ranging from 30 m²/g to 60 m²/g.

7. A pigment, filler or mineral in the dry state obtained by drying the aqueous suspension according to claim 1.

8. A process for treating pigments, fillers or minerals in aqueous suspension, containing a natural carbonate, comprising treating said pigments, fillers or minerals with a combination of one or more medium-strong to strong $H_3O^+$ ion-providers and gaseous $CO_2$, wherein said strong $H_3O^+$ ion-providers are selected from the group consisting of acids having a pKa value of less than or equal to zero at 22° C., and said medium-strong $H_3O^+$ ion-providers are selected from the group consisting of acids having a pKa value of between zero and 2.5 inclusive at 22° C., and wherein the pigments, fillers or minerals have a BET specific surface area, measured in accordance with the ISO 9277 Standard, of between 5 m²/g and 200 m²/g.

9. The process according to claim 8, wherein the gaseous $CO_2$ comes from an external $CO_2$ supply or from the recirculation of $CO_2$ or from the continuous addition of the same or not medium-strong to strong provider of $H_3O^+$ ions as used in the treatment of from an excess pressure of $CO_2$.

10. The process according to claim 8, further comprising the following three stages:
   a) Treatment with one or more medium-strong to strong providers of $H_3O^+$ ions
   b) Treatment with gaseous $CO_2$, whether this treatment be an integral part of stage a), be carried out in parallel with stage a) or be carried out after stage a)
   c) The raising of the pH beyond 7.5, measured at 20° C., in a time interval after the end of stages a) and b) of between 1 hour and 10 hours without addition of a base, or immediately after the end of stages a) and b) with the addition of a base, stage c) being the final stage in the process.

11. The process according to claim 10, wherein stages a) and b) may be repeated several times.

12. The process according to claim 10, wherein the pH measured at 20° C. is between 3 and 7.5 during stages a) and b) of the treatment and by the fact that the treatment temperature is between 5° C. and 90° C.

13. The process according to claim 10, wherein the concentration of gaseous $CO_2$ in the suspension is, in terms of the volume ratio volume of suspension:volume of gaseous $CO_2$ between 1:0.05 and 1:20 with said ratio being between 1:1 and 1:20 in stage a) and between 1:0.05 and 1:1 in stage b).

14. The process according to claim 13, wherein the concentration of gaseous $CO_2$ in the suspension is, in terms of the volume ratio which is the volume of suspension:volume of gaseous $CO_2$ between 1:0.05 and 1:10 with the said ratio being between 1:0.5 and 1:10 in stage a) and between 1:0.05 and 1:1 in stage b).

15. The process according to claim 10, wherein the duration of stage b) of the treatment is between 0 hours and 10 hours.

16. The process according to claim 8, wherein the pigment, filler or mineral containing natural carbonate is chosen from the group consisting of natural carbonate, carbonate containing a dolomite, mixtures thereof with talc, mixtures thereof with kaolin, mixtures thereof with titanium oxide $TiO_2$, magnesium oxide MgO and other minerals which are inert towards medium-strong to strong $H_3O^+$ ion-providers.

17. The process according to claim 16, wherein the natural calcium carbonate is a marble, a calcite or a chalk.

18. The process according to claim 8, wherein the strong provider or providers of $H_3O^+$ ions is hydrochloric acid or sulphuric acid and the medium-strong provider or providers of $H_3O^+$ ions is selected from group consisting of $H_2SO_3$, $HSO_4^-$, $H_3PO_4$ and oxalic acid.

19. The process according to claim 10, further comprising the addition of a dispersing agent and optionally a reconcentration stage, after the third stage of treatment.

20. An aqueous suspension of a plurality of pigments, fillers or minerals containing a natural carbonate, wherein said suspension is obtained by the process according to claim 8.

21. An aqueous suspension according to claim 20, wherein the pigment, filler or mineral containing a natural carbonate is chosen from the group consisting of natural carbonate, carbonate containing a dolomite, mixtures thereof with talc, mixtures thereof with kaolin, mixtures thereof with titanium oxide $TiO_2$, magnesium oxide MgO and other minerals which are inert towards medium-strong to strong $H_3O^+$ ion-providers.

22. A pigment, filler or mineral in the dry state, obtained by drying an aqueous suspension according to claim 20.

23. A preparation for use in paper-making, comprising at least one aqueous suspension according to claim 1.

24. A process for coating paper comprising applying the aqueous suspension as claimed in claim 1 onto a sheet of paper.

25. A process for making a paper sheet with a paper filler comprising manufacturing a sheet of paper with the aqueous suspension claimed in claim 1.

26. A process for coating and manufacturing a sheet of paper comprising coating and impregnating, in any order, a sheet of paper with the aqueous solution claimed in claim 1 wherein said aqueous solution acts as a paper filler and as a preparation for coating and pigmentation of the surface of the paper.

27. The process as claimed in claim 25 wherein, the weight of the paper produced, at constant surface area, is reduced by 3% to 15%.

28. A paint or coating comprising the aqueous suspension as claimed in claim 1.

29. A process for manufacturing a sheet of paper or board comprising incorporating a suspension or preparation according to claim 1 in a process of manufacture of the sheet in terms of the preparation of a thick stock or a thin stock or both, one or more times.

30. A process for manufacturing a sheet of paper or board comprising incorporating a suspension or preparation according to claim 1 in the process of manufacture of said sheet wherein said suspension or preparation is added to a recycled white liquor or to a recycled coating broke.

31. A process for manufacturing a sheet of paper or board comprising incorporating a suspension or preparation according to claim 8 in the process of manufacture of said sheet wherein said suspension or preparation is added to a recycled white liquor or to a recycled coating broke.

32. A process for manufacturing a sheet of paper or board comprising incorporating a suspension or preparation according to claim 1 in the process of manufacture of said sheet wherein said sheet is obtained from cellulose fibers made from wood.

33. A process for manufacturing a sheet of paper or board comprising incorporating a suspension or preparation according to claim 1 in the process of manufacture of said sheet wherein said sheet is obtained from fibers not originating from wood.

34. A paper or board obtained by the process as claimed in claim 29.

35. A method of printing comprising digitally applying ink onto the paper or board claimed in claim 34.

36. The aqueous suspension claimed in claim 1 wherein the natural carbonate is selected from the group consisting of marble, calcite, chalk and carbonate containing dolomite.

37. The aqueous suspension according to claim 4, wherein the quantity in moles of the medium-strong to strong $H_3O^+$ ion-providers relative to the number of moles of $CaCO_3$ is in total between 0.25 and 1.

38. The aqueous suspension according to claim 1, wherein the pigment, filler or mineral has a BET specific surface area, measured in accordance with the ISO 9277 Standard, of from 20 $m^2/g$ to 80 $m^2/g$.

39. The aqueous suspension according to claim 1, wherein the pigment, filler or mineral has a BET specific surface area, measured in accordance with the ISO 9277 Standard, of from 30 $m^2/g$ to 60 $m^2/g$.

40. The aqueous suspension according to claim 5, wherein the pigment, filler or mineral presents the following characteristics:
   a mean grain diameter, measured by the sedimentation method on a Sedigraph 5100™, between 25 and 0.5 micrometers, and a BET specific surface area, measured in accordance with ISO 9277, ranging from 20 m²/g to 80 m²/g.

41. The process as claimed in claim 9, wherein the $CO_2$ pressure is from 0.05 to 5 bars.

42. The process as claimed in claim 10, wherein the raising of the pH beyond 7.5, measured at 20° C., in a time interval after the end of stages a) and b) of between 1 hour and 5 hours without addition of a base, or immediately after the end of stages a) and b) with the addition of a base, stage c) being the final stage in the process.

43. The process as claimed in claim 12 wherein the treatment temperature is between 45 and 60° C.

44. The process as claimed in claim 15 wherein the duration of stage b) of the treatment is between 2 hours and 6 hours.

45. A preparation for use in paper-making, comprising at least one aqueous suspension according to claim 20.

46. A process for coating paper comprising applying the aqueous suspension as claimed in claim 20 onto a sheet of paper.

47. A process for making a paper sheet with a paper filler comprising manufacturing a sheet of paper with the aqueous suspension claimed in claim 20.

48. A process for coating and manufacturing a sheet of paper comprising coating and impregnating, in any order, a sheet of paper with the aqueous solution claimed in claim 20 wherein said aqueous solution acts as a paper filler and as a preparation for coating and pigmentation of the surface of the paper.

49. A paint or coating comprising the aqueous suspension as claimed in claim 20.

50. A process for manufacturing a sheet of paper or board comprising incorporating a suspension or preparation according to claim 20 in the process of manufacture of the sheet in terms of a preparation of a thick stock or a thin stock or both, one or more times.

51. A process for manufacturing a sheet of paper or board comprising incorporating a suspension or preparation according to claim 20 in the process of manufacture of said sheet wherein said suspension or preparation is added to a recycled white liquor or to a recycled coating broke.

52. The process claimed in claim 32 wherein said cellulose fibers are from a deciduous or resinous wood.

53. A process for manufacturing a sheet of paper or board comprising incorporating a suspension or preparation according to claim 50 in the process of manufacture of said sheet wherein said suspension or preparation is added to a recycled white liquor or to a recycled coating broke.

54. A process for manufacturing a sheet of paper or board comprising incorporating a suspension or preparation according to claim 50, in the process of manufacture of said sheet wherein said suspension or preparation is added to a recycled white liquor or to a recycled coating broke.

55. A process for manufacturing a sheet of paper or board comprising incorporating a suspension or preparation according to claim 50 in the process of manufacture of said sheet wherein said sheet is obtained from cellulose fibers made from wood.

56. A process for manufacturing a sheet of paper or board comprising incorporating a suspension or preparation according to claim 50 in the process of manufacture of said sheet wherein said sheet is obtained from fibers not originating from wood.

57. A paper or board obtained by the process as claimed in claim 50.

58. A method of printing comprising digitally applying ink onto the paper or board claimed in claim 57.

59. A preparation for use in paper-making, comprising at least one aqueous suspension according to claim 20.

* * * * *

UNITED STATES PATENT AND TRADEMARK OFFICE
CERTIFICATE OF CORRECTION

PATENT NO. : 6,666,953 B1  
DATED : December 23, 2003  
INVENTOR(S) : Patrick A. Gane et al.

It is certified that error appears in the above-identified patent and that said Letters Patent is hereby corrected as shown below:

<u>Title page,</u>  
Item [57], ABSTRACT,  
Line 2, "treated with one of more" should read -- treated with one or more --.

<u>Column 1,</u>  
Line 3, insert the following:

-- BACKGROUND OF THE INVENTION  
Field of the Invention --.  
Line 10, heading of "DESCRIPTION OF THE BACKGROUND" should read  
-- Description of the Background --.  
Line 42, insert -- SUMMARY OF THE INVENTION --.

<u>Column 14,</u>  
Line 66, "pH of the slurry is 8,1," should read -- pH of the slurry is 8.1, --.

<u>Column 20,</u>  
Line 8, "the control Test no. 15)" should read -- the control (Test no. 15) --.

<u>Column 26,</u>  
Line 22, "paper, of a polyacrylarnide" should read -- paper, of a polyacrylamide --.

Signed and Sealed this

Ninth Day of November, 2004

JON W. DUDAS  
*Director of the United States Patent and Trademark Office*